United States Patent
Sugaya

(10) Patent No.: US 11,296,832 B2
(45) Date of Patent: Apr. 5, 2022

(54) WIRELESS LAN COMMUNICATION APPARATUS AND WIRELESS LAN COMMUNICATION METHOD

(71) Applicant: SONY CORPORATION, Tokyo (JP)

(72) Inventor: Shigeru Sugaya, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/648,250

(22) PCT Filed: Jul. 11, 2018

(86) PCT No.: PCT/JP2018/026111
§ 371 (c)(1),
(2) Date: Mar. 18, 2020

(87) PCT Pub. No.: WO2019/064815
PCT Pub. Date: Apr. 4, 2019

(65) Prior Publication Data
US 2020/0235863 A1 Jul. 23, 2020

(30) Foreign Application Priority Data

Sep. 27, 2017 (JP) .............................. JP2017-185634

(51) Int. Cl.
*H04L 1/18* (2006.01)
*H04L 1/00* (2006.01)
*H04W 84/12* (2009.01)

(52) U.S. Cl.
CPC ............ *H04L 1/189* (2013.01); *H04L 1/0061* (2013.01); *H04W 84/12* (2013.01)

(58) Field of Classification Search
CPC ......... H04L 1/18; H04L 1/189; H04L 1/0061; H04W 84/12
See application file for complete search history.

(56) References Cited

U.S. PATENT DOCUMENTS

| 5,390,149 A | 2/1995 | Vogley et al. |
| 5,889,790 A | 3/1999 | Fukuda |

(Continued)

FOREIGN PATENT DOCUMENTS

| CN | 1168583 A | 12/1997 |
| CN | 1312988 A | 9/2001 |

(Continued)

OTHER PUBLICATIONS

International Search Report and Written Opinion of PCT Application No. PCT/JP2018/026111, dated Sep. 25, 2018, 14 pages of ISRWO.

(Continued)

*Primary Examiner* — Jamal Javaid
(74) *Attorney, Agent, or Firm* — Chip Law Group

(57) ABSTRACT

[Object] To make it possible to reduce wasteful retransmission processing and improve use efficiency of communication channels with regard to wireless LAN systems. [Solving Means] There is provided a wireless LAN communication apparatus including: a transmitter that transmits a data frame storing a plurality of fixed-length pieces of coded data for which it is possible to determine whether or not decoding is successfully performed; and a controller that controls retransmission processing in units of the pieces of coded data.

19 Claims, 47 Drawing Sheets

(56) References Cited

U.S. PATENT DOCUMENTS

| | | | |
|---|---|---|---|
| 2001/0024435 A1 | 9/2001 | Birdwell et al. | |
| 2003/0076783 A1* | 4/2003 | Das | H04L 1/0003 370/236 |
| 2005/0114489 A1 | 5/2005 | Yonge et al. | |
| 2008/0225783 A1* | 9/2008 | Wang | H04W 72/042 370/329 |
| 2015/0097474 A1 | 4/2015 | Fox | |
| 2015/0138999 A1 | 5/2015 | Avudainayagam et al. | |
| 2016/0033778 A1 | 11/2016 | Chiachiang et al. | |
| 2016/0337783 A1* | 11/2016 | Seok | H04L 63/0428 |

FOREIGN PATENT DOCUMENTS

| | | |
|---|---|---|
| CN | 103975550 A | 8/2014 |
| CN | 105745856 A | 7/2016 |
| EP | 0794630 A2 | 9/1997 |
| EP | 1626519 A2 | 2/2006 |
| EP | 2104245 A1 | 9/2009 |
| JP | 09-298528 A | 11/1997 |
| JP | 10-041922 A | 2/1998 |
| JP | 2000-029772 A | 1/2000 |
| JP | 2001-502142 A | 2/2001 |
| JP | 2002-522954 A | 7/2002 |
| JP | 2009-017186 A | 1/2009 |
| JP | 2009-081567 A | 4/2009 |
| JP | 5254369 A | 8/2013 |
| JP | 5254369 B2 | 8/2013 |
| JP | 2014-528682 A | 10/2014 |
| JP | 2017-502558 A | 1/2017 |
| JP | 2017-038261 A | 2/2017 |
| WO | 98/016046 A1 | 4/1998 |
| WO | 2000/008796 A1 | 2/2000 |
| WO | 2013/055181 A1 | 4/2013 |
| WO | 2015/077128 A1 | 5/2015 |
| WO | 2017/026198 A1 | 2/2017 |

OTHER PUBLICATIONS

Extended European Search Report received for 18863645.0, dated May 25, 2021, pp. 10.

Sangki Yun et al., "Towards Zero Retransmission Overhead: A Symbol Level Network Coding Approach to Retransmission" IEEE Transactions on Mobile Computing, IEEE Service Center, Los Alamitos, CA, US, vol. 10, No. 8, Aug. 1, 2011 (Aug. 1, 2011), pp. 1083-1095, XP011368903,ISSN: 1536-1233, DOI: 10.1109/TMC. 2010.248, p. 9, col. 1-col. 2.

Office Action for TW Patent Application No. 107132573, dated Nov. 2, 2021, 16 pages of Office Action.

* cited by examiner

[FIG. 1]
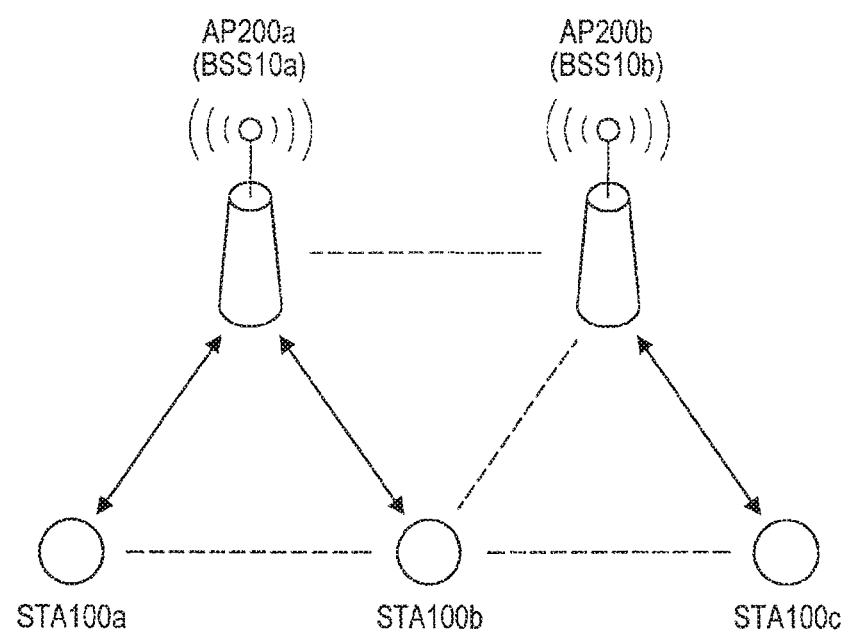

[FIG. 2]
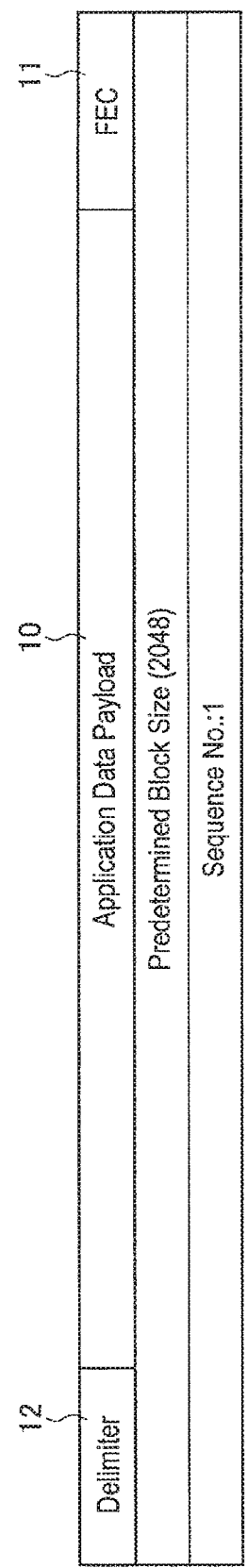

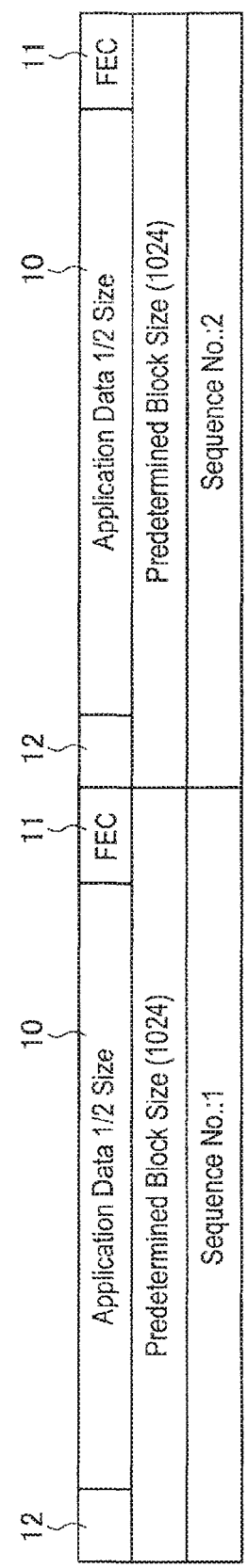
[FIG. 3]

[FIG. 4]

| 12 | 11 | 10 | | | 12 | 11 | 10 | | | 12 | 11 | 10 | | | 12 | 11 | 10 | | |
|---|---|---|---|---|---|---|---|---|---|---|---|---|---|---|---|---|---|---|---|
| | | Data 1/4 | Block Size (512) | Sequence No.:1 | | | Data 1/4 | Block Size (512) | Sequence No.:2 | | | Data 1/4 | Block Size (512) | Sequence No.:3 | | | Data 1/4 | Block Size (512) | Sequence No.:4 |

[FIG. 5]
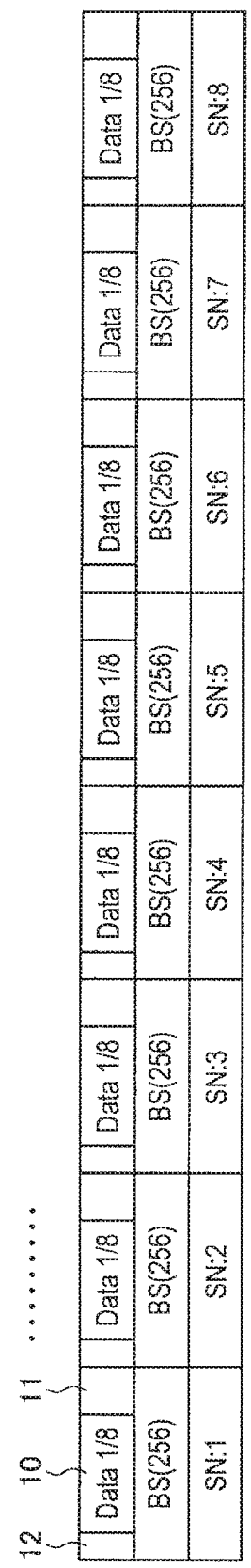

[FIG. 6]

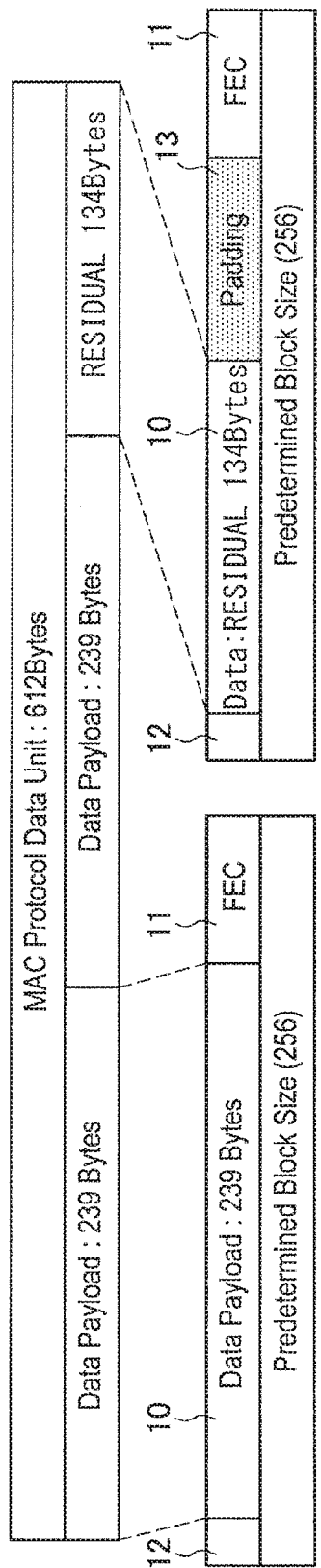

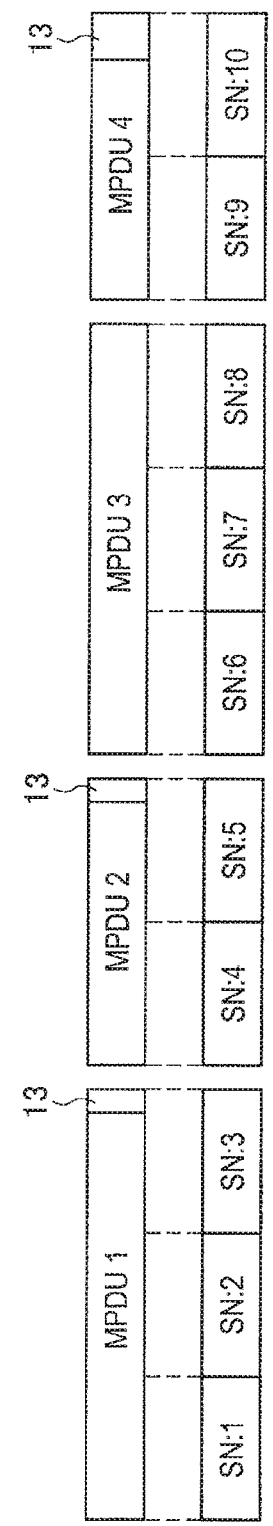
[FIG. 8]

[FIG. 9]
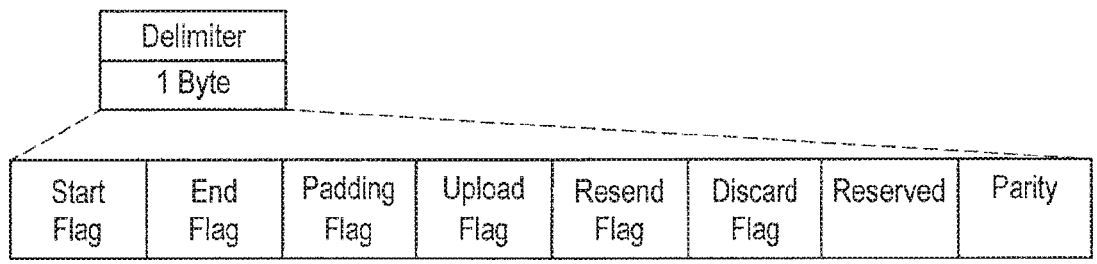

[FIG. 10]

| Preamble | Header | 1st Data Block | 2nd Data Block | 3rd Data Block | 4th Data Block | 5th Data Block | 6th Data Block | 7th Data Block | 8th Data Block |

[FIG. 11]

| Preamble | Header | 8th Data Block | 7th Data Block | 6th Data Block | 5th Data Block | 4th Data Block | 3rd Data Block | 2nd Data Block | 1st Data Block |
|---|---|---|---|---|---|---|---|---|---|

[FIG. 12]

| Preamble | Header | Resend Data #1 | 1st Data Block | 2nd Data Block | 3rd Data Block | 4th Data Block | 5th Data Block | 6th Data Block | 7th Data Block |

[FIG. 13]

| Preamble | Header | 7th Data Block | 6th Data Block | 5th Data Block | 4th Data Block | 3rd Data Block | 2nd Data Block | 1st Data Block | Resend Data #1 |

[FIG. 14]

| Preamble | Header | Resend Data #1 | Resend Data #2 | Resend Data #3 | Resend Data #4 | 1st Data Block | 2nd Data Block | 3rd Data Block | 4th Data Block |

[FIG. 15]

| Preamble | Header | 4th Data Block | 3rd Data Block | 2nd Data Block | 1st Data Block | Resend Data #4 | Resend Data #3 | Resend Data #2 | Resend Data #1 |

[FIG. 16]

| Preamble | Header | Resend Data #1 | Resend Data #2 | Resend Data #3 | Resend Data #4 | Resend Data #5 | Resend Data #6 | Resend Data #7 | Resend Data #8 |

[FIG. 17]

| Preamble | Header | Resend Data #8 | Resend Data #7 | Resend Data #6 | Resend Data #5 | Resend Data #4 | Resend Data #3 | Resend Data #2 | Resend Data #1 |

[FIG. 18]

| Preamble | Header | Resend Data #1 | Resend Data #2 | 1st Data Block | 2nd Data Block | 3rd Data Block | 4th Data Block | Repeat Data #1 | Repeat Data #2 |

[FIG. 19]

| Preamble | Header | Repeat Data #2 | Repeat Data #1 | 4th Data Block | 3rd Data Block | 2nd Data Block | 1st Data Block | Resend Data #2 | Resend Data #1 |

[FIG. 20]

| Preamble | Header | Resend Data #1 | Resend Data #2 | Resend Data #3 | Resend Data #4 | Repeat Data #1 | Repeat Data #2 | Repeat Data #3 | Repeat Data #4 |

[FIG. 21]

| Preamble | Header | 1st Data Block | 2nd Data Block | 3rd Data Block | 4th Data Block | 5th Data Block | 6th Data Block | 7th Data Block | 8th Data Block |

| Header | | | | | | | |
|---|---|---|---|---|---|---|---|
| Type | RX AID | TX AID | Block Size | Block Length | Count | 1st S/N | S/N Bitmap | F/R | CRC |

[FIG. 22]

| Type | |
|---|---|
| 0 | Reserved |
| 1 | Type1 |
| 2 | Type2 |
| 3 | Type3 |
| 4 | Type4 |
| 5 | Reserved |
| 6 | Reserved |
| 7 | Reserved |

[FIG. 23]

| Block Size | |
|---|---|
| 0 | Reserved |
| 1 | 32 Bytes Block |
| 2 | 64 Bytes Block |
| 3 | 128 Bytes Block |
| 4 | 256 Bytes Block |
| 5 | 512 Bytes Block |
| 6 | 1024 Bytes Block |
| 7 | 2048 Bytes Block |
| 8-15 | Reserved |

[FIG. 24]

| Block Length | |
|---|---|
| 0 | Response Frame |
| 1 | Block ×1 |
| 2 | Block ×2 |
| 3 | Block ×4 |
| 4 | Block ×6 |
| 5 | Block ×8 |
| 6 | Block ×12 |
| 7 | Block ×16 |
| 8-15 | Reserved |

[FIG. 25]

| Count | |
|---|---|
| 0 | Reserved |
| 1-15 | No repeat Blocks |

[FIG. 26]

| F/R (Forward / Reverse) | |
|---|---|
| 0 | Forward Seq |
| 1 | Reverse Seq |

[FIG. 27]
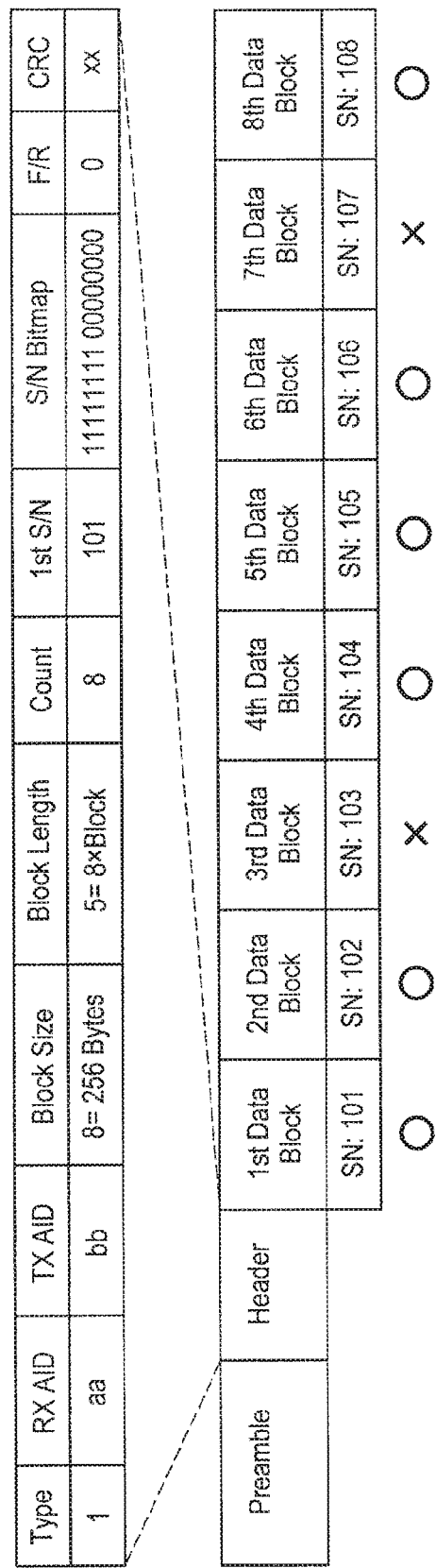

[FIG. 28]
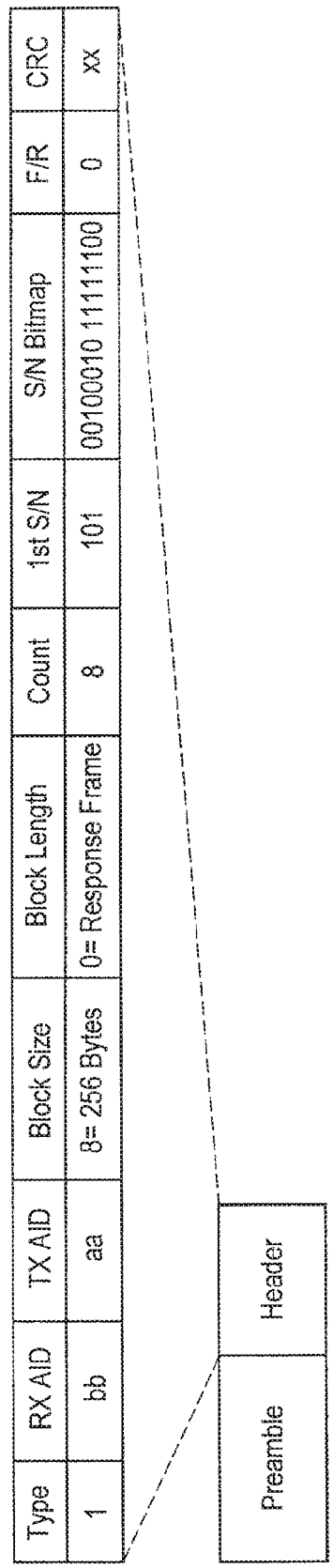

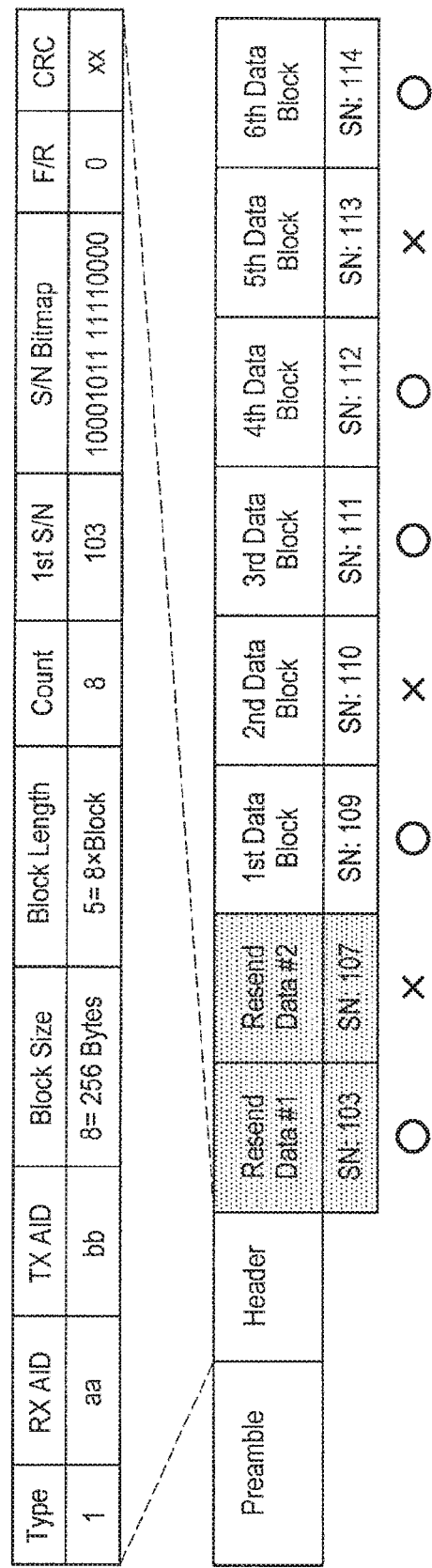
[FIG. 29]

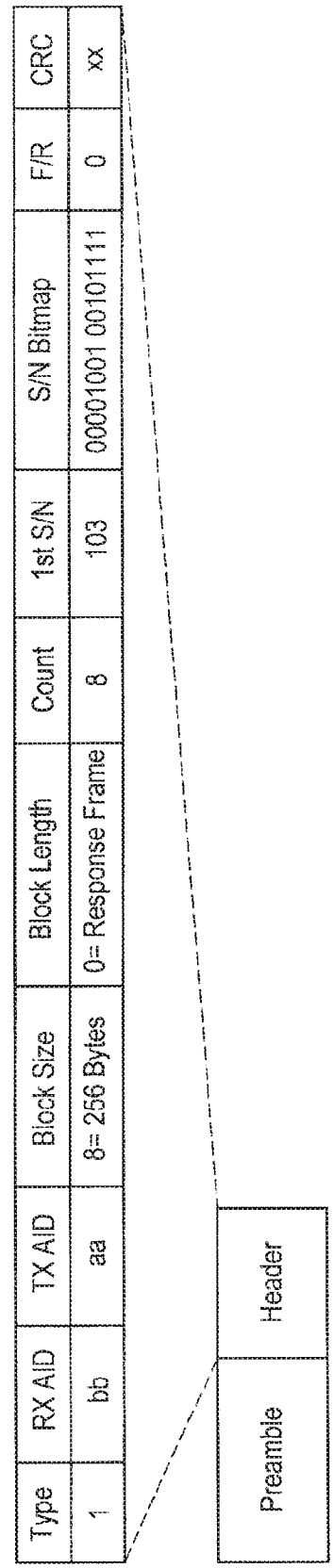
[FIG. 30]

[FIG. 31]
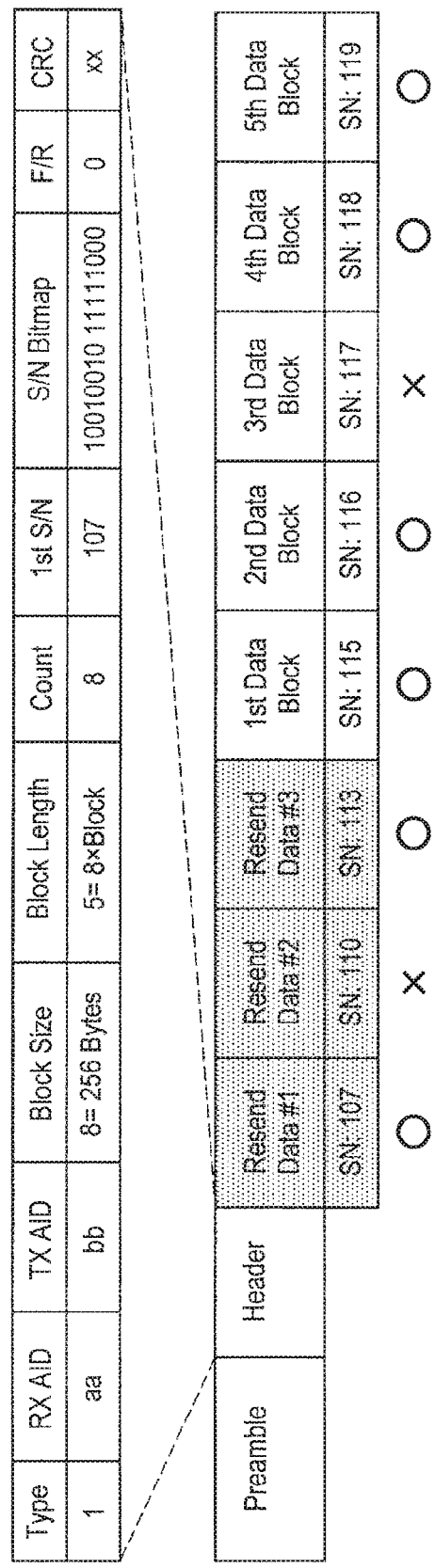

[FIG. 32]
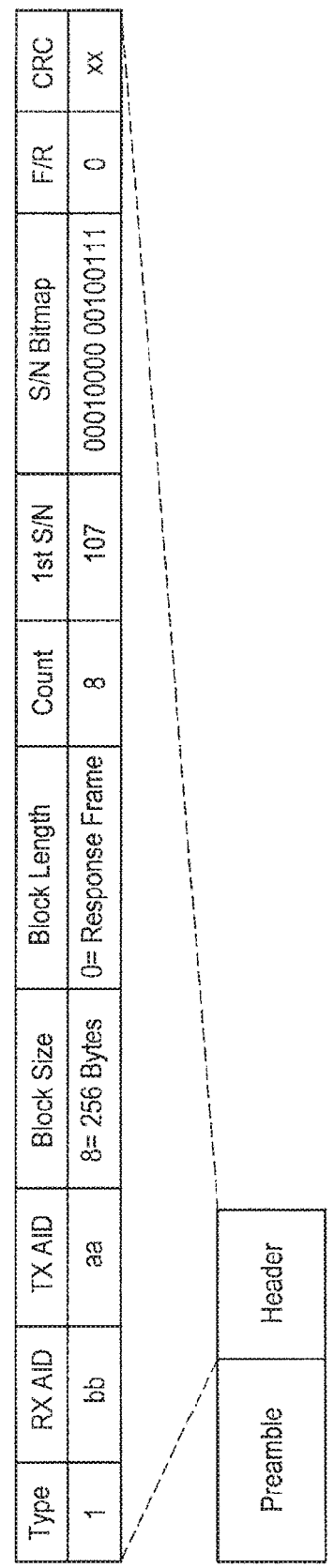

[FIG. 33]

| Type | RX AID | TX AID | Block Size | Block Length | Count | 1st S/N | S/N Bitmap | F/R | CRC |
|---|---|---|---|---|---|---|---|---|---|
| 1 | aa | bb | 8 = 256 Bytes | 5 = 8×Block | 8 | 107 | 10010010 11111000 | 1 | xx |

| Preamble | Header | Resend Data #8 SN:119 | Resend Data #7 SN:118 | Resend Data #6 SN:117 | Resend Data #5 SN:116 | Resend Data #4 SN:115 | Resend Data #3 SN:113 | Resend Data #2 SN:110 | Resend Data #1 SN:107 |
|---|---|---|---|---|---|---|---|---|---|
| | | ○ | ○ | ○ | ○ | ○ | ○ | × | ○ |

[FIG. 34]
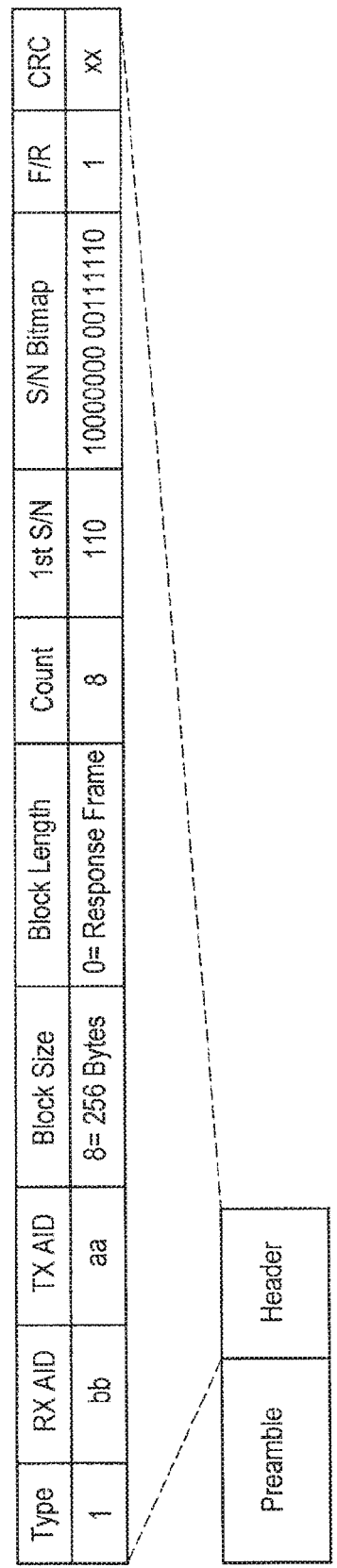

[FIG. 35]

[FIG. 36]
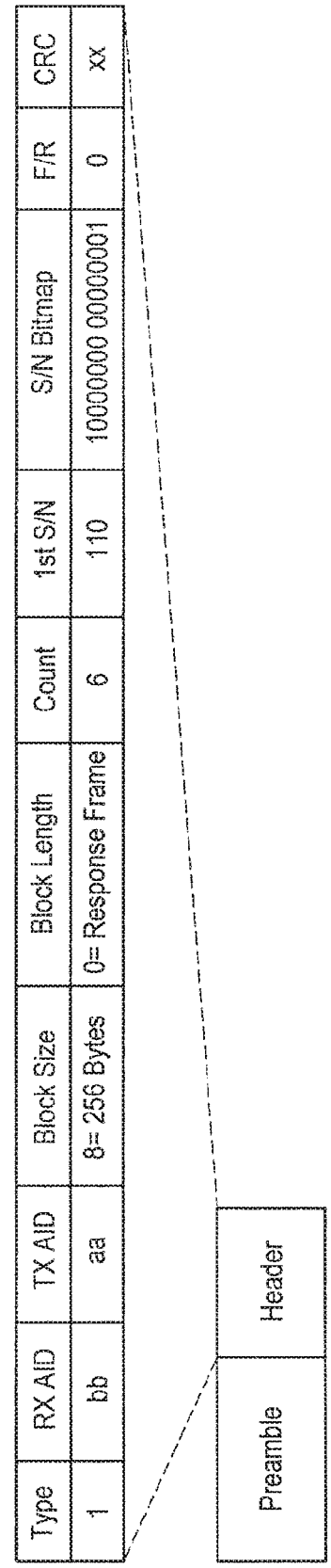

[FIG. 37]
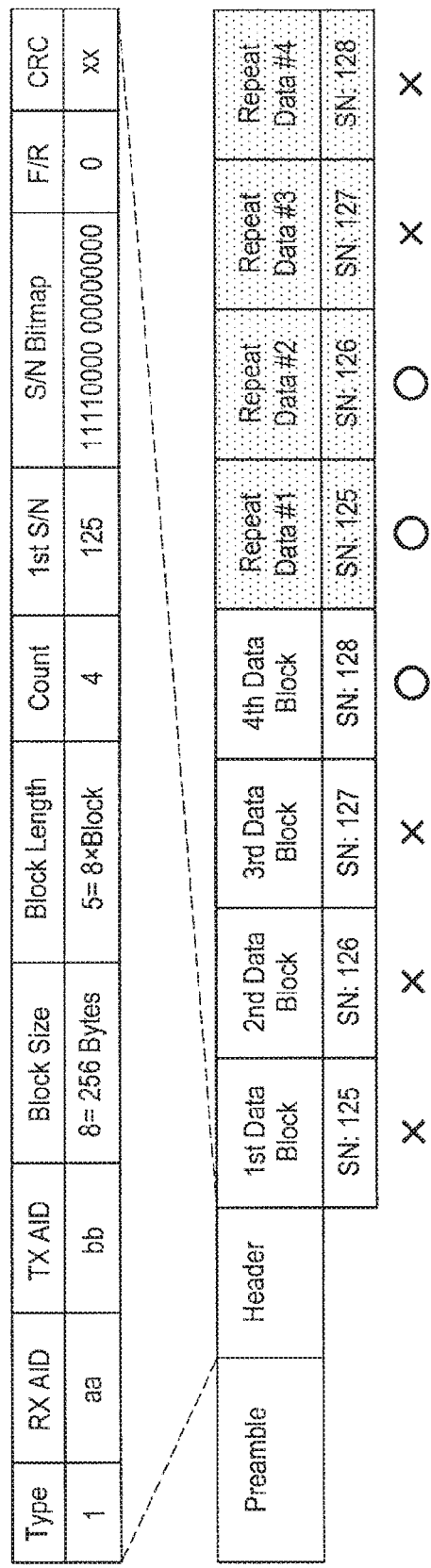

[FIG. 38]
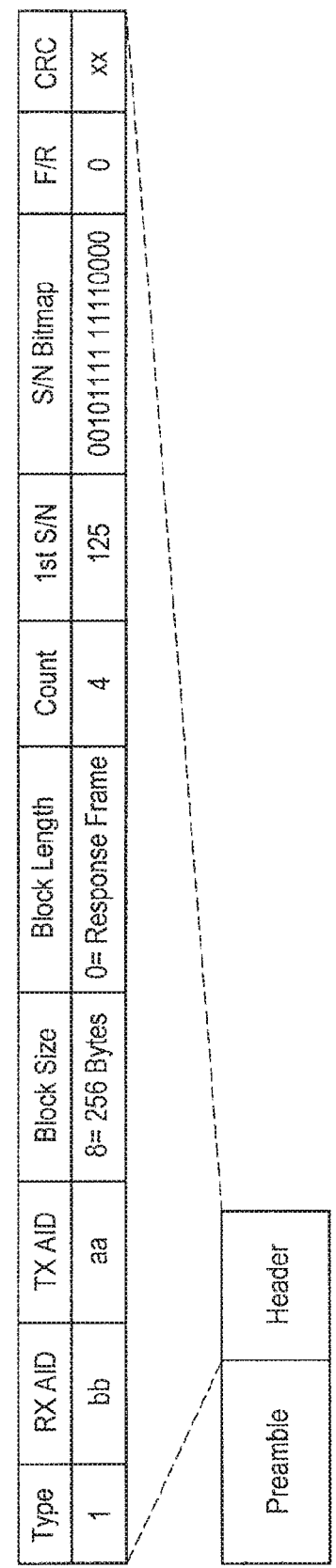

[FIG. 39]
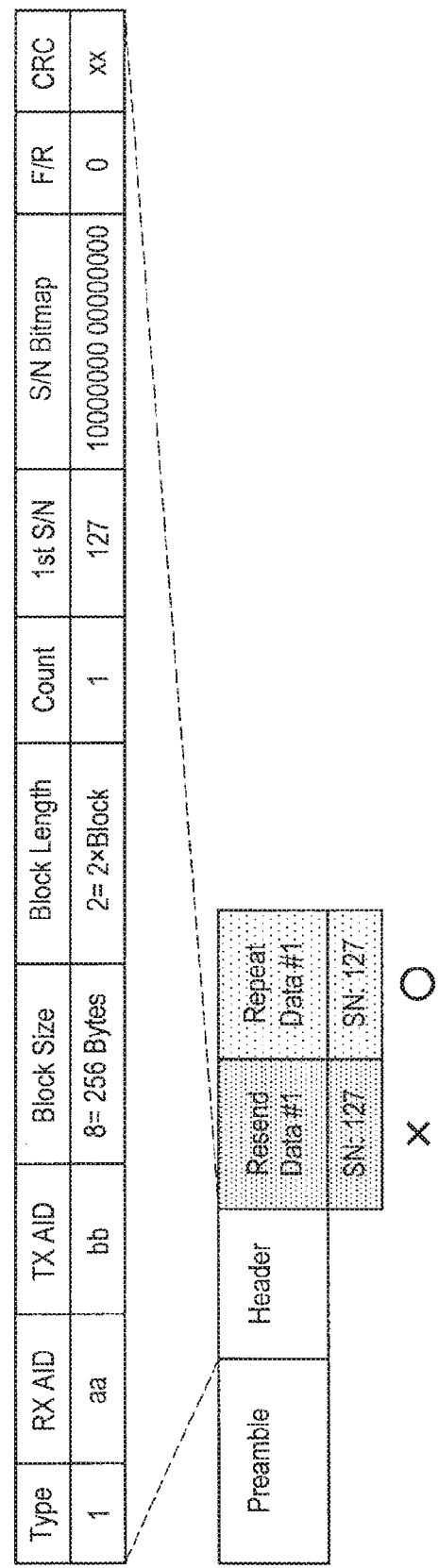

[FIG. 40]
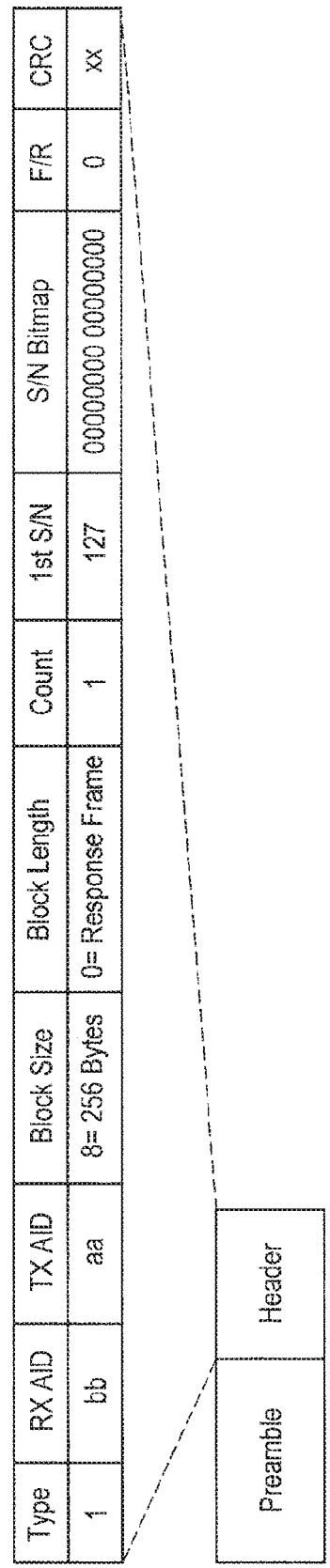

[FIG. 41]
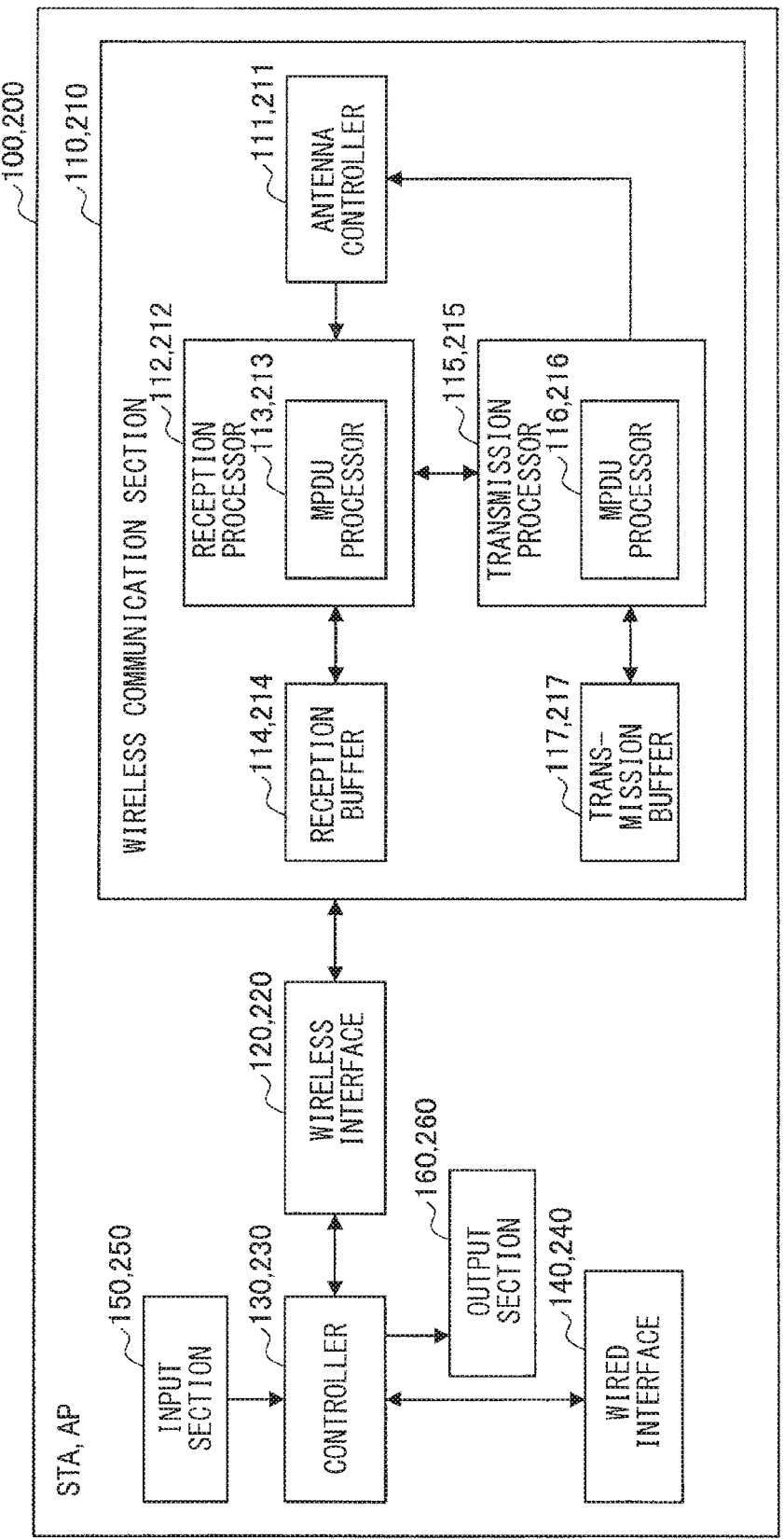

[FIG. 42]
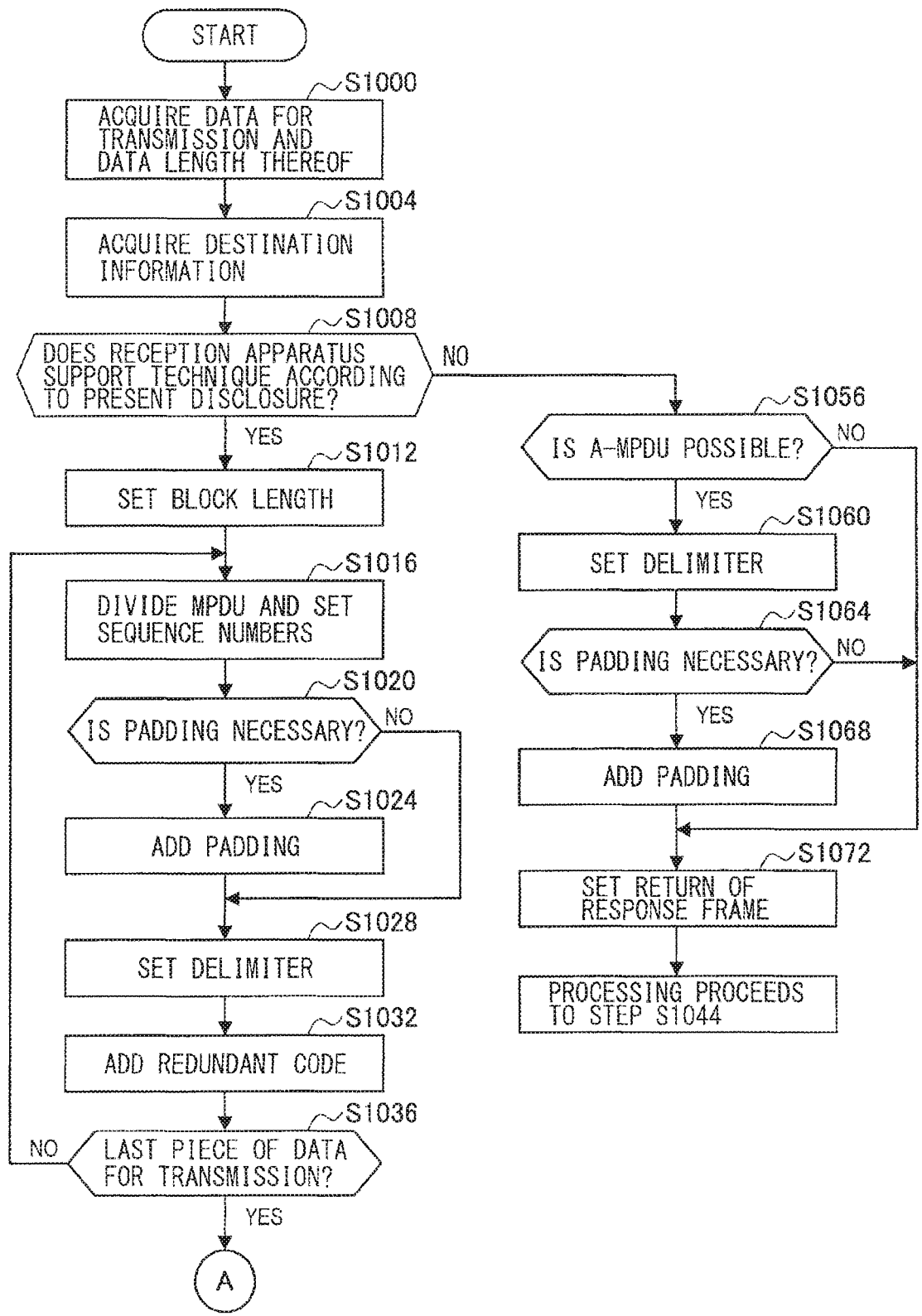

[FIG. 43]
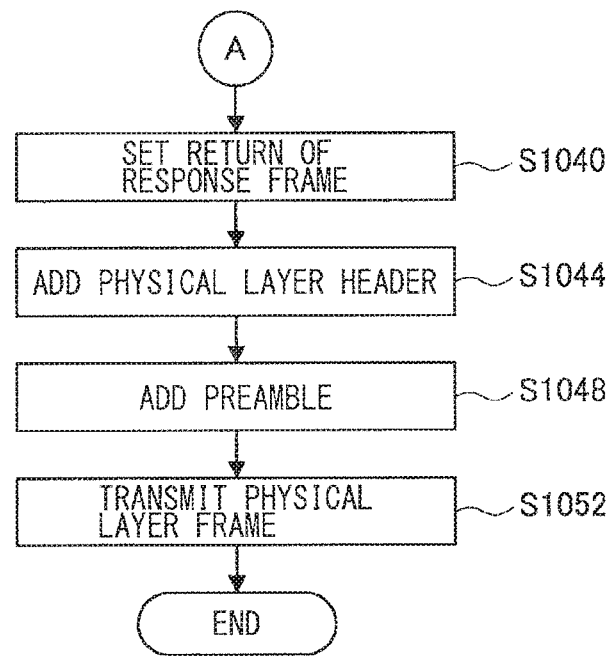

[FIG. 44]
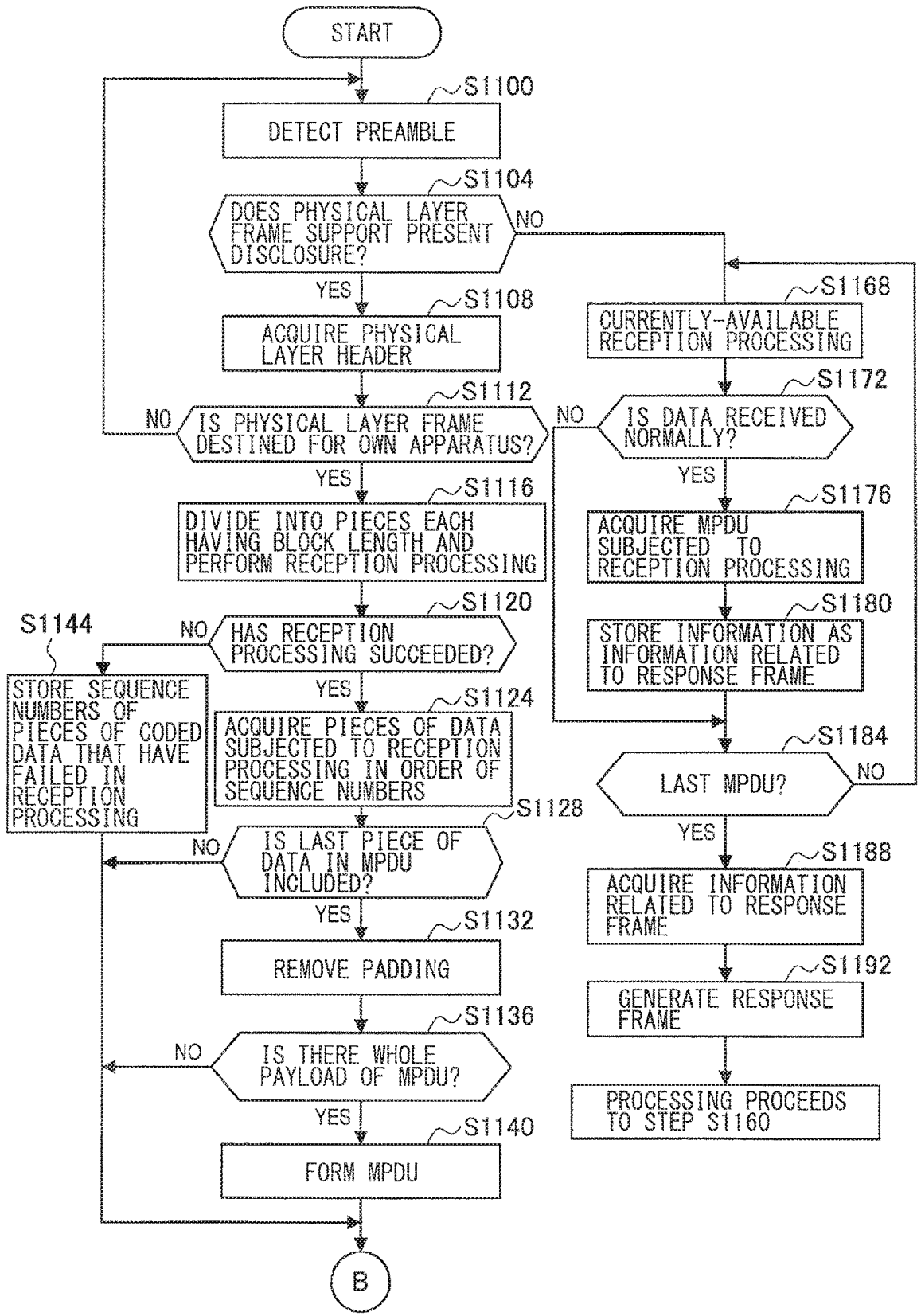

[FIG. 45]
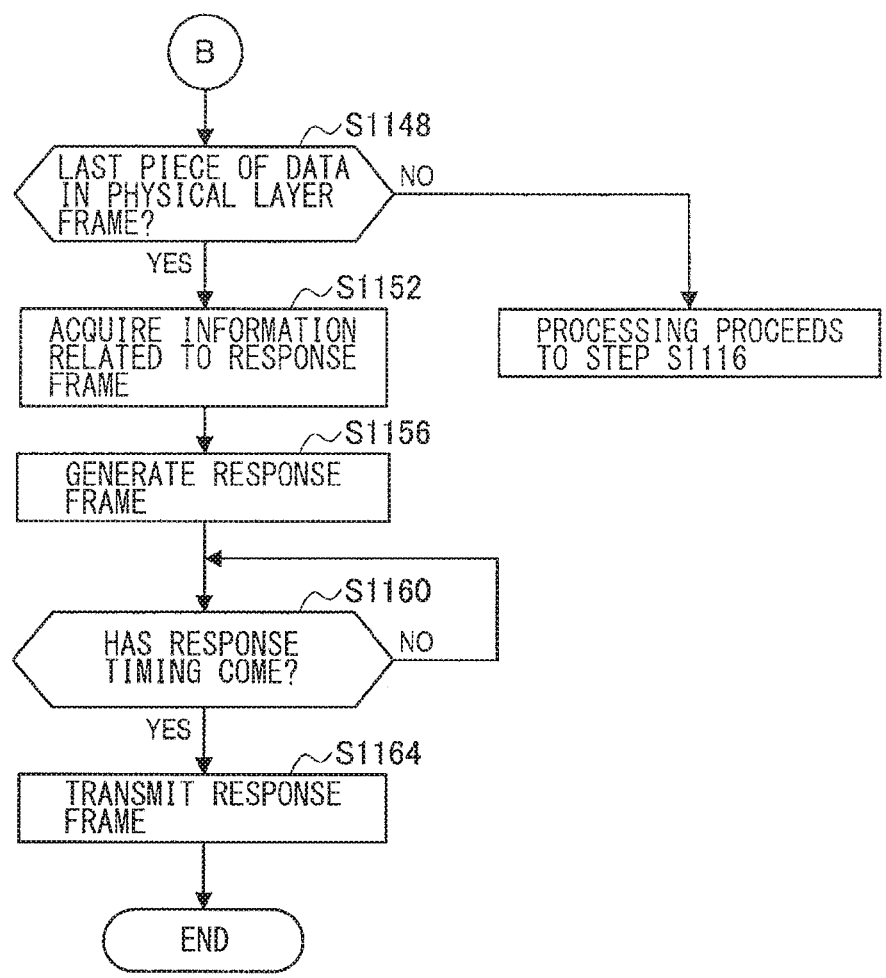

[FIG. 46]
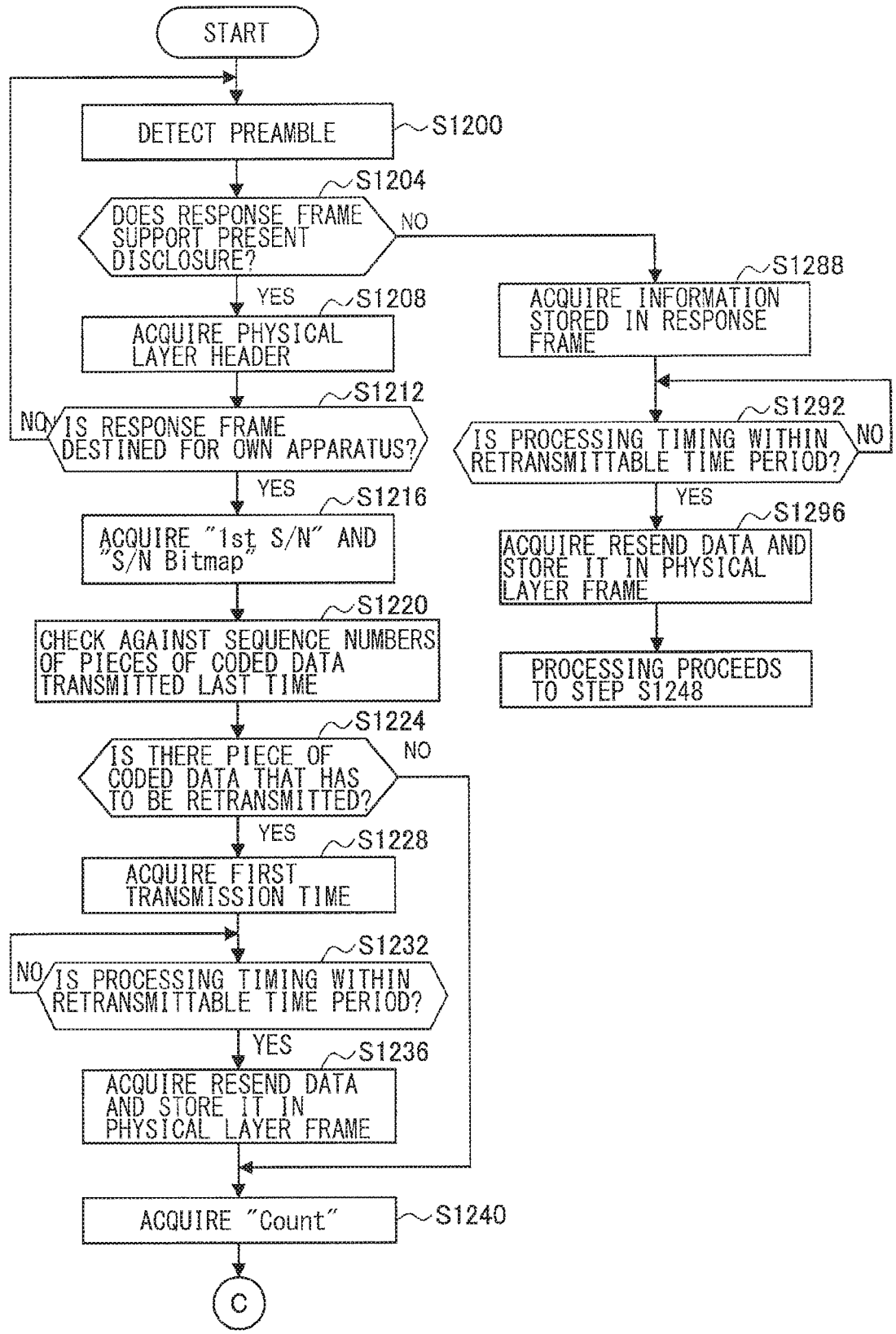

[FIG. 47]
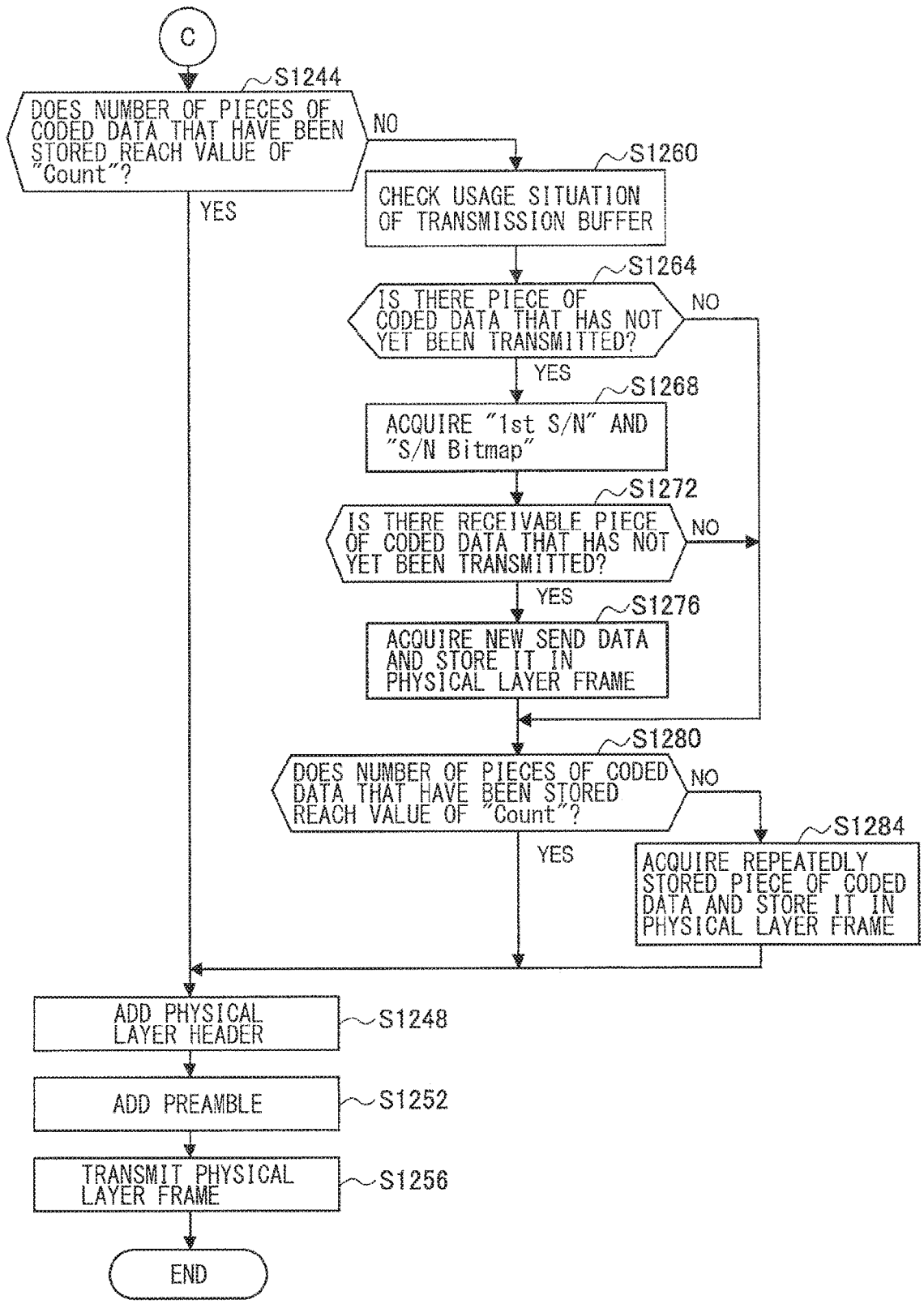

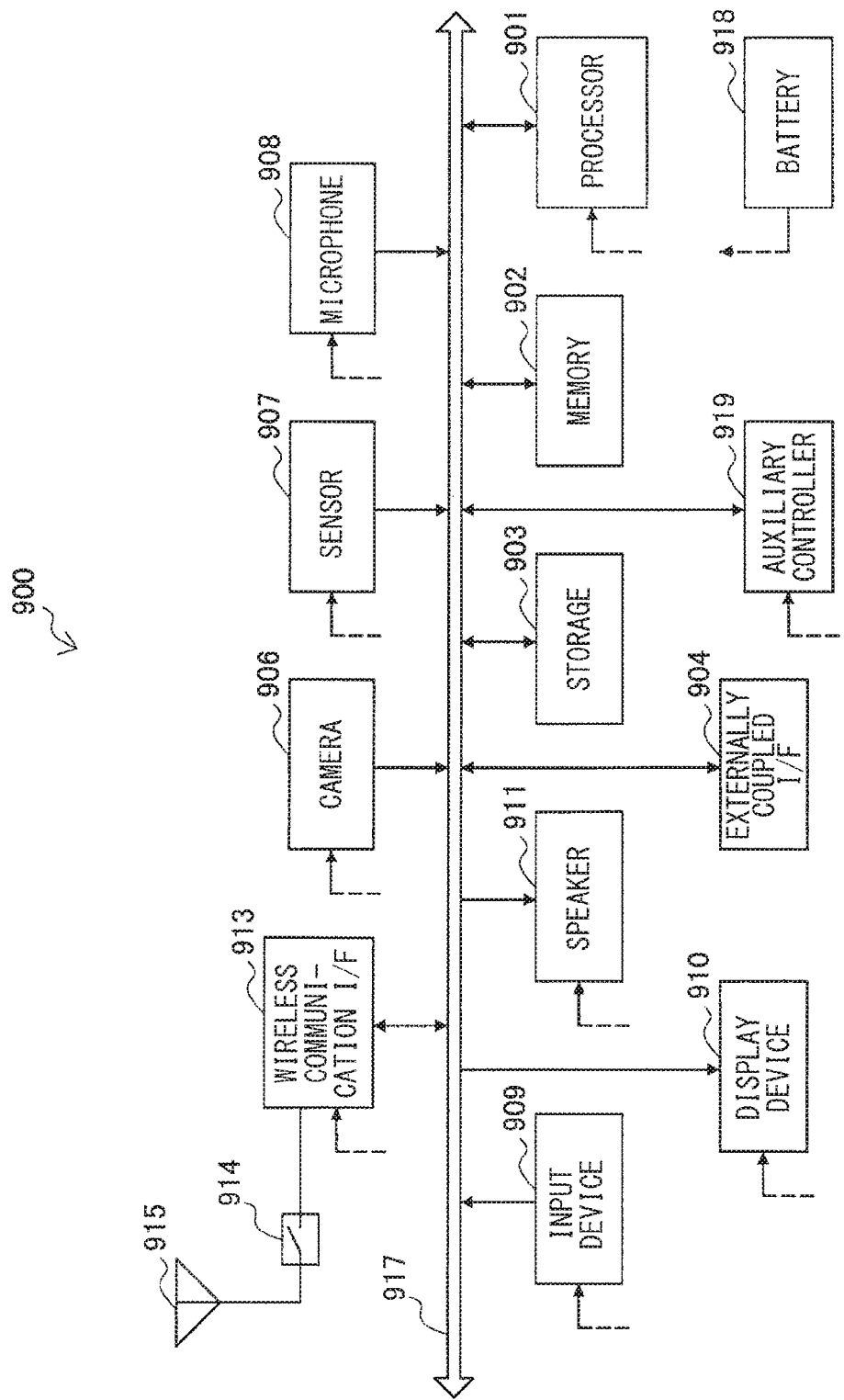
[FIG. 48]

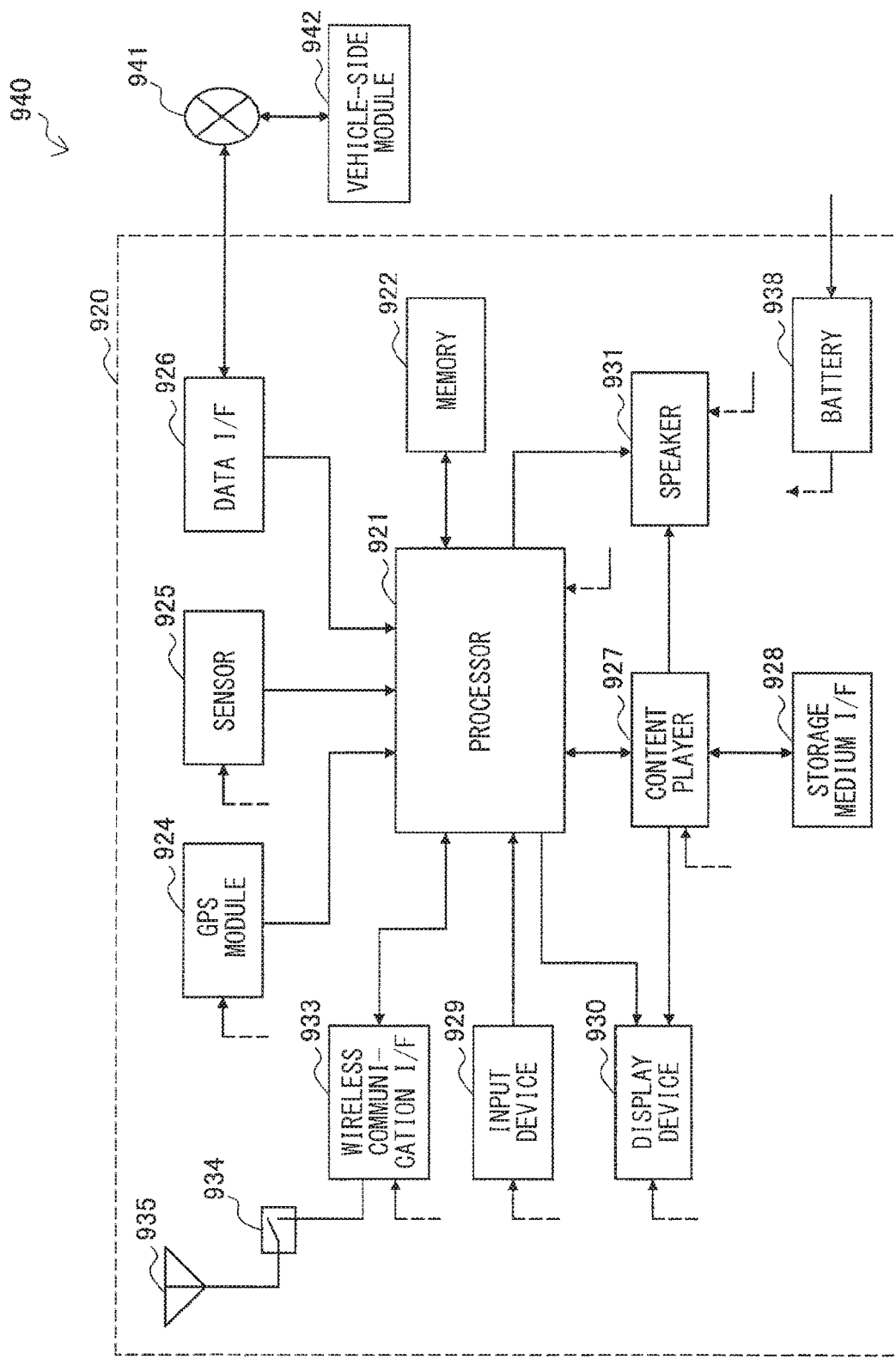
[FIG. 49]

[FIG. 50]
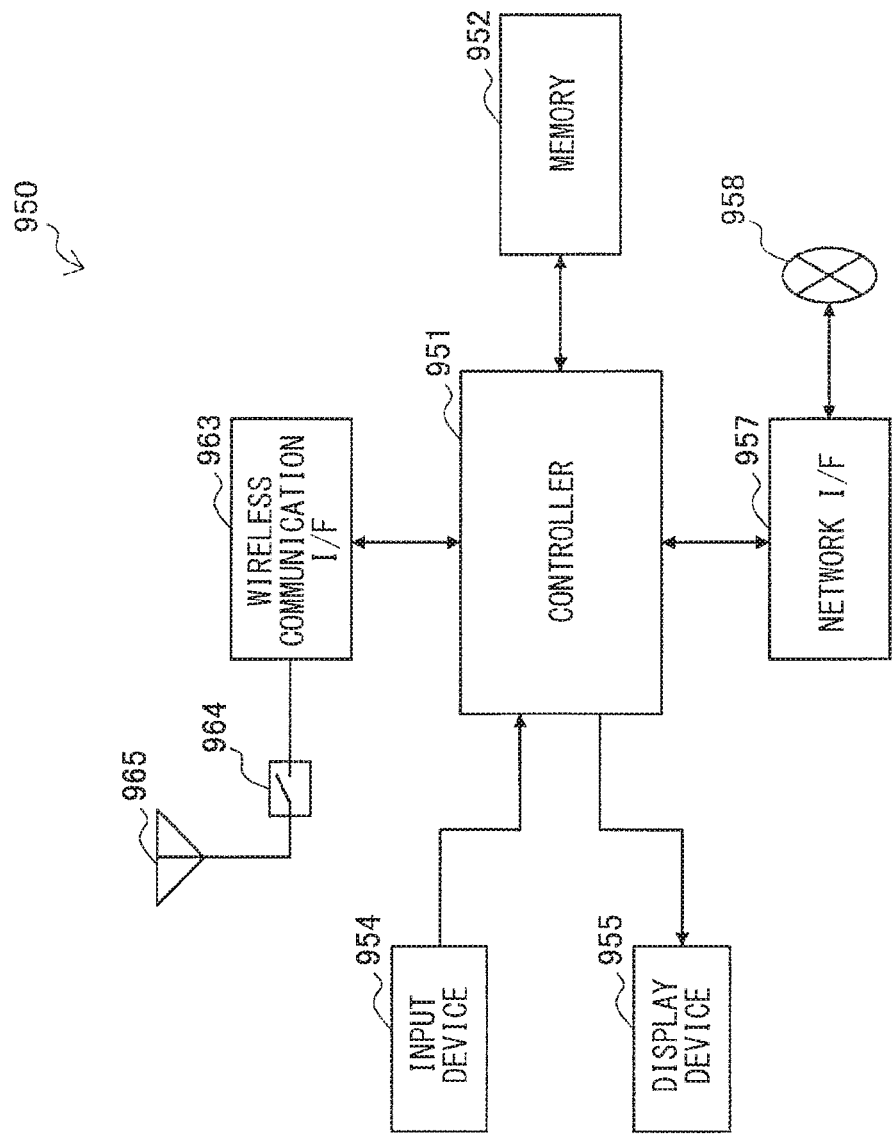

WIRELESS LAN COMMUNICATION APPARATUS AND WIRELESS LAN COMMUNICATION METHOD

CROSS REFERENCE TO RELATED APPLICATIONS

This application is a U.S. National Phase of International Patent Application No. PCT/JP2018/026111 filed on Jul. 11, 2018, which claims priority benefit of Japanese Patent Application No. JP 2017-185634 filed in the Japan Patent Office on Sep. 27, 2017. Each of the above-referenced applications is hereby incorporated herein by reference in its entirety.

TECHNICAL FIELD

The present disclosure relates to a wireless LAN communication apparatus, a wireless LAN communication method, and a wireless LAN communication program.

BACKGROUND ART

In recent years, with development of communication techniques, various techniques related to retransmission processing have been developed. For example, with regard to a wireless communication technique, a technique related to retransmission processing called hybrid automatic repeat request (hybrid ARQ) (hereinafter, referred to as "HRAQ") has been developed.

For example, PTL 1 listed below discloses techniques for adding HARQ to wireless LAN protocols with MAC based feedback.

CITATION LIST

Patent Literature

PTL 1: Japanese Patent No. 5254369

SUMMARY OF THE INVENTION

Problems to be Solved by the Invention

Here, it has been desired for wireless LAN systems to reduce wasteful retransmission processing and improve use efficiency of communication channels. More specifically, the wireless LAN systems communicate variable-length data (for example, MAC layer Protocol Data Unit (MPDU) or the like). Therefore, it is necessary to manage each sequence when performing fragment processing for predetermined access control, it is difficult to perform control, and it is difficult to directly apply the HARQ to the wireless LAN systems.

In a nod to the above described issues, the present disclosure provides a novel and improved wireless LAN communication apparatus, wireless LAN communication method, and wireless LAN communication program that make it possible to reduce wasteful retransmission processing and improve use efficiency of communication channels with regard to wireless LAN systems.

Means for Solving the Problem

According to the present disclosure, there is provided a wireless LAN communication apparatus including: a transmitter that transmits a data frame storing a plurality of fixed-length pieces of coded data for which it is possible to determine whether or not decoding is successfully performed; and a controller that controls retransmission processing in units of the pieces of coded data.

In addition, according to the present disclosure, there is provided a wireless LAN communication method performed by a computer, the method including: transmitting a data frame storing a plurality of fixed-length pieces of coded data for which it is possible to determine whether or not decoding is successfully performed; and controlling retransmission processing in units of the pieces of coded data.

In addition, according to the present disclosure, there is provided a wireless LAN communication program that causes a computer to: transmit a data frame storing a plurality of fixed-length pieces of coded data for which it is possible to determine whether or not decoding is successfully performed; and control retransmission processing in units of the pieces of coded data.

In addition, according to the present disclosure, there is provided a wireless LAN communication apparatus including: a receiver that receives a data frame storing a plurality of fixed-length pieces of coded data for which it is possible to determine whether or not decoding is successfully performed; and a controller that controls retransmission processing in units of the pieces of coded data.

In addition, according to the present disclosure, there is provided a wireless LAN communication method performed by a computer, the method including: receiving a data frame storing a plurality of fixed-length pieces of coded data for which it is possible to determine whether or not decoding is successfully performed; and controlling retransmission processing in units of the pieces of coded data.

In addition, according to the present disclosure, there is provided a wireless LAN communication program that causes a computer to: receive a data frame storing a plurality of fixed-length pieces of coded data for which it is possible to determine whether or not decoding is successfully performed; and control retransmission processing in units of the pieces of coded data.

Advantageous Effect of the Invention

As described above, according to the present disclosure, it is possible to reduce wasteful retransmission processing and improve use efficiency of communication channels with regard to wireless LAN systems.

It is to be noted that the above-described effects are not necessarily limitative. In addition to or in place of the above effects, there may be achieved any of the effects described in the present specification or other effects that may be grasped from the present specification.

BRIEF DESCRIPTION OF THE DRAWINGS

FIG. 1 illustrates a configuration example of a wireless LAN system according to the present embodiment.

FIG. 2 illustrates a specific example of coded data obtained in a case where block length of coding is set to 2048 bytes.

FIG. 3 illustrates a specific example of coded data obtained in a case where block length of coding is set to 1024 bytes.

FIG. 4 illustrates a specific example of coded data obtained in a case where block length of coding is set to 512 bytes.

FIG. 5 illustrates a specific example of coded data obtained in a case where block length of coding is set to 256 bytes.

FIG. 6 illustrates a specific example of coded data obtained in a case where block length of coding is set to 128 bytes.

FIGS. 7A and 7B illustrate a specific example of dividing processing of an MPDU.

FIG. 8 illustrates a specific example of a case where pieces of coded data are sequentially generated from a plurality of MPDUs.

FIG. 9 illustrates a specific example of contents of a delimiter.

FIG. 10 illustrates a specific example of a plurality of pieces of coded data stored in a physical layer frame.

FIG. 11 illustrates a specific example of a plurality of pieces of coded data stored in a physical layer frame.

FIG. 12 illustrates a specific example of a plurality of pieces of coded data stored in a physical layer frame.

FIG. 13 illustrates a specific example of a plurality of pieces of coded data stored in a physical layer frame.

FIG. 14 illustrates a specific example of a plurality of pieces of coded data stored in a physical layer frame.

FIG. 15 illustrates a specific example of a plurality of pieces of coded data stored in a physical layer frame.

FIG. 16 illustrates a specific example of a plurality of pieces of coded data stored in a physical layer frame.

FIG. 17 illustrates a specific example of a plurality of pieces of coded data stored in a physical layer frame.

FIG. 18 illustrates a specific example of a plurality of pieces of coded data stored in a physical layer frame.

FIG. 19 illustrates a specific example of a plurality of pieces of coded data stored in a physical layer frame.

FIG. 20 illustrates a specific example of a plurality of pieces of coded data stored in a physical layer frame.

FIG. 21 illustrates a specific example of contents of a physical layer header.

FIG. 22 illustrates specific examples of information stored in a "Type" field in the physical layer header.

FIG. 23 illustrates specific examples of information stored in a "Block Size" field in the physical layer header.

FIG. 24 illustrates specific examples of information stored in a "Block Length" field in the physical layer header.

FIG. 25 illustrates specific examples of information stored in a "Count" field in the physical layer header.

FIG. 26 illustrates specific examples of information stored in an "F/R" field in the physical layer header.

FIG. 27 illustrates a specific example of retransmission control in the wireless LAN system.

FIG. 28 illustrates a specific example of retransmission control in the wireless LAN system.

FIG. 29 illustrates a specific example of retransmission control in the wireless LAN system.

FIG. 30 illustrates a specific example of retransmission control in the wireless LAN system.

FIG. 31 illustrates a specific example of retransmission control in the wireless LAN system.

FIG. 32 illustrates a specific example of retransmission control in the wireless LAN system.

FIG. 33 illustrates a specific example of retransmission control in the wireless LAN system.

FIG. 34 illustrates a specific example of retransmission control in the wireless LAN system.

FIG. 35 illustrates a specific example of retransmission control in the wireless LAN system.

FIG. 36 illustrates a specific example of retransmission control in the wireless LAN system.

FIG. 37 illustrates a specific example of retransmission control in the wireless LAN system.

FIG. 38 illustrates a specific example of retransmission control in the wireless LAN system.

FIG. 39 illustrates a specific example of retransmission control in the wireless LAN system.

FIG. 40 illustrates a specific example of retransmission control in the wireless LAN system.

FIG. 41 is a block diagram illustrating a functional element example of an AP 200 and an STA 100.

FIG. 42 is a flowchart illustrating a specific example of transmission operation of a physical layer frame performed by the AP 200 and the STA 100.

FIG. 43 is a flowchart illustrating the specific example of transmission operation of the physical layer frame performed by the AP 200 and the STA 100.

FIG. 44 is a flowchart illustrating a specific example of reception operation of a physical layer frame performed by the AP 200 and the STA 100.

FIG. 45 is a flowchart illustrating the specific example of reception operation of the physical layer frame performed by the AP 200 and the STA 100.

FIG. 46 is a flowchart illustrating a specific example of retransmission operation of a physical layer frame performed by the AP 200 and the STA 100.

FIG. 47 is a flowchart illustrating the specific example of retransmission operation of the physical layer frame performed by the AP 200 and the STA 100.

FIG. 48 is a block diagram illustrating an example of a schematic configuration of a smartphone.

FIG. 49 is a block diagram illustrating an example of a schematic configuration of a car navigation apparatus.

FIG. 50 is a block diagram illustrating an example of a schematic configuration of a wireless access point.

MODES FOR CARRYING OUT THE INVENTION

Hereinafter, preferred embodiments of the present disclosure will be described in detail with reference to the appended drawings. It is to be noted that, in the present specification and drawings, repeated description is omitted for components substantially having the same functional configuration by assigning the same reference numerals.

It is to be noted that the description is given in the following order.
1. Background
2. Wireless LAN System according to Embodiment of Present Disclosure
2-1. System Configuration
2-2 Functional Overview
2-3 Details of Functions
2-4 Specific Example of Retransmission Control
2-5 Functional Elements of Apparatuses
2-6 Operation of Apparatuses
3. Application Examples
4. Conclusion

1. BACKGROUND

First, a background of the present disclosure is described.

As described above, in recent years, with development of communication techniques, various techniques related to retransmission processing have been developed. For example, techniques related to retransmission processing called HARQ have been developed with regard to wireless communication techniques. For example, in a public wireless communication system, an appropriate block length is defined on the basis of the number of sub-carriers in a physical layer, and retransmission processing is performed in units of the block length. In this case, the block length that is the unit of the retransmission processing is a fixed length. This makes it easy to perform the retransmission processing and sequence management.

Here, it has been desired for wireless LAN systems to reduce wasteful retransmission processing and improve use efficiency of communication channels. More specifically, the wireless LAN systems communicate variable-length data (for example, the MPDU or the like). Therefore, it is difficult to perform fragment processing for predetermined access control, and it is difficult to directly apply the HARQ to the wireless LAN systems. For example, in a case where the HARQ is applied to a wireless LAN system, variable-length data communicated in the wireless LAN system has a different delimiting position from blocks of the HARQ.

In addition, the wireless LAN system controls retransmission in units of MPDUs. Therefore, even if the HARQ is used as processing in a lower layer than a MAC layer, the retransmission is not controlled in units supporting the HARQ. For example, even if only one HARQ block includes an error, the whole MPDU, which is larger than the HARQ block, is retransmitted, and use efficiency of a communication channel is not improved.

Here, when a frame aggregation technique is applied to the wireless LAN system, it is possible to aggregate a plurality of data units. This makes it possible to reduce overhead of frame transmission and improve transmission efficiency. Among frame aggregation techniques, a technique called an aggregated MPDU (A-MPDU) is especially effective and has been widely used in general. According to the A-MPDU technique, a plurality of MPDUs are aggregated as a single physical layer frame.

In a case where the HARQ is applied to the A-MPDU and a boundary between MPDUs includes a block to which error correction of HARQ is not applied, MPDUs other than an MPDU including an error are also retransmitted. Therefore, use efficiency of a communication channel is not improved. In particular, the number of the boundaries between MPDUs increases as difference between block length of the HARQ and data length of the MPDUs decreases. Therefore, such retransmission has a bigger effect. When using the techniques disclosed in PTL 1 for adding HARQ to wireless LAN protocols with MAC based feedback, the above-described problem becomes prominent.

In view of such circumstances, the present invention has been developed by the inventor of the present invention. According to the present disclosure, it is possible to reduce wasteful retransmission processing and improve use efficiency of communication channels with regard to wireless LAN systems.

2. WIRELESS LAN SYSTEM ACCORDING TO EMBODIMENT OF PRESENT DISCLOSURE

The background of the present disclosure has been described above. Next, a wireless LAN system according to an embodiment of the present disclosure is described.
(2-1. System Configuration)

First, with reference to FIG. 1, a system configuration of the wireless LAN system according to the present embodiment is described.

As illustrated in FIG. 1, the wireless LAN system according to the present embodiment includes access point apparatuses (hereinafter, referred to as "APs (access points)") 200 and station apparatuses (hereinafter, referred to as "STAs (stations)") 100. In addition, one of the APs 200 and one or more of the STAs 100 constitute a basic service set (hereinafter, referred to as a "BSS") 10.

The wireless LAN system according to the present embodiment may be installed in any place. For example, the wireless LAN system according to the present embodiment may be installed in office buildings, housing, commercial facilities, public facilities, or the like.

Sometimes an area of the BSS 10 according to the present embodiment may overlap with an area of another BSS 10 using an overlapping frequency channel (hereinafter, referred to as "overlap basic service set (OBSS)"); in that case, a signal transmitted from the STA 100 located in the overlap area may interfere with a signal transmitted from the OBSS. When description is given using the example of FIG. 1, an area of a BSS 10*a* overlaps with a portion of an area of a BSS 10*b* that is an OBSS, and an STA 100*b* is located in the overlap area. In this case, a signal transmitted from the STA 100*b* belonging to the BSS 10*a* may interfere with a signal transmitted from the AP 200*b* or an STA 100*c* belonging to the BSS 10*b*. It is to be noted that FIG. 1 illustrates the example in which another wireless LAN system causes interference. However, the present invention is not limited thereto. For example, interference may be caused when a communication terminal and a communication base station of a communication system other than the wireless LAN system overlap with the BSS 10*a*.

The APs 200 are wireless LAN communication apparatuses that is coupled to an external network, and that establish communication between the external network and the STAs 100. For example, the APs 200 are coupled to the Internet, and establish communication between the STAs 100 and apparatuses on the Internet or apparatuses coupled via the Internet.

The STAs 100 are wireless LAN communication apparatuses that communicate with the APs 200. The STAs 100 may be any communication apparatuses. For example, the STA 100 may be a display with a display function, a memory with a storage function, a keyboard and a mouse with input functions, a speaker with a sound output function, a smartphone with a function of executing advanced calculation processing, or the like.

It is to be noted that the functions according to the present disclosure may be achieved by any of the APs 200 or the STAs 100, or may be achieved by both the AP 200 and STA 100 (in other words, the APs 200 and the STAs 100 may have the same functional configuration). Therefore, hereinafter, any or both of the APs 200 and STAs 100 may be referred to as "transmission apparatuses" and/or "reception apparatuses".
(2-2 Functional Overview)

The configuration of the wireless LAN system according to the present embodiment has been described above. Next, a functional overview of the wireless LAN system according to the present embodiment is described.

In the wireless LAN system according to the present embodiment, a data frame storing a plurality of fixed-length pieces of coded data for which it is possible to determine whether or not decoding is successfully performed is transmitted and received, and retransmission processing is controlled in units of pieces of the coded data.

More specifically, the transmission apparatus divides an MPDU into pieces each having data length corresponding to block length of coding, and generates coded data by using the divided data. Next, the transmission apparatus adds a sequence number to each piece of the coded data, generates a physical layer frame by aggregating the plurality of pieces of coded data, and transmits the physical layer frame. At this time, the transmission apparatus stores, in a physical layer header, information or the like for specifying the block length of coding, the number of aggregated pieces of coded data, respective pieces of the coded data, and the like.

In a case where the reception apparatus receives the physical layer frame, the reception apparatus recognizes the block length of coding, the number of aggregated pieces of coded data, and the like by analyzing the physical layer header, and performs reception processing including error detection processing and error correction processing on the basis of such information. Next, the reception apparatus forms the original MPDU by performing combining processing on the plurality of pieces of coded data that has succeeded in reception processing. If the reception processing has failed, the reception apparatus requests retransmission of a piece of the coded data that has failed in the reception processing. More specifically, the reception apparatus generates a response frame storing information to be used for specifying the piece of the coded data that has to be retransmitted or the like, and transmits the response frame to the transmission apparatus.

In a case where the transmission apparatus has received the response frame, the transmission apparatus recognizes the piece of the coded data that has to be retransmitted on the basis of the information stored in the response frame, and retransmits the piece of the coded data. The reception apparatus performs the reception processing including the error detection processing and the error correction processing on the retransmitted piece of the coded data. Next, in a case where the reception processing has succeeded, the reception apparatus forms the original MPDU by performing the combining processing using the retransmitted data additionally.

As described above, it is possible for the wireless LAN system according to the present embodiment to reduce wasteful retransmission processing and improve use efficiency of communication channels by controlling the retransmission processing not in units of MPDUs but in units of pieces of coded data. In other words, it is not necessary for the wireless LAN system according to the present embodiment to perform retransmission processing in units of MPDUs, each of which has larger data length than a piece of the coded data. In addition, it is possible for the wireless LAN system according to the present embodiment to improve efficiency of the transmission processing including coding processing, and efficiency of the reception processing including decoding processing by storing fixed-length coded data in the physical layer frame.

It is to be noted that, in the present embodiment, the case where the MPDU is used as a data frame is described as described above. However, it is also possible to use a data frame other than the MPDU. For example, it is possible to use a MAC layer service data unit (MSDU), a so-called control frame, a so-called management frame, or a so-called action frame.

(2-3 Details of Functions)

The functional overview of the wireless LAN system according to the present embodiment has been described above. Next, details of functions of the wireless LAN system according to the present embodiment are described.

As described above, the transmission apparatus divides an MPDU into pieces each having data length corresponding to block length of coding, and generates coded data. At this time, the block length of coding is not specifically limited.

For example, as illustrated in FIG. 2, the block length of coding may be 2048 bytes. More specifically, the transmission apparatus may generate coded data of 2048 bytes by adding a redundant code 11 (referred to as "FEC" in FIG. 2) and a delimiter 12 (referred to as "Delimiter" in FIG. 2) to data 10 for transmission (referred to as "Application Data Payload" in FIG. 2). In addition, the transmission apparatus adds a sequence number to each 2048-byte piece of coded data (in FIG. 2, "Sequence No. 1" is added). It is to be noted that contents of the delimiter 12 are described later.

In addition, FIG. 3 illustrates a specific example of coded data obtained in a case where block length of coding is set to 1024 bytes. As illustrated in FIG. 3, the transmission apparatus may generate coded data of 1024 bytes by adding the redundant code 11 and the delimiter 12 (not referred to as "Delimiter" because of limited space of boxes) to data 10 for transmission. In addition, the transmission apparatus adds a sequence number to each 1024-byte piece of coded data (in FIG. 3, "Sequence No. 1" and "Sequence No. 2" are added).

In addition, FIG. 4 illustrates a specific example of coded data obtained in a case where block length of coding is set to 512 bytes. As illustrated in FIG. 4, the transmission apparatus may generate coded data of 512 bytes by adding the redundant code 11 (not referred to as "FEC" because of limited space of boxes) and the delimiter 12 to data 10 for transmission. In addition, the transmission apparatus adds a sequence number to each 512-byte piece of coded data (in FIG. 4, "Sequence No. 1" to "Sequence No. 4" are added).

In addition, FIG. 5 illustrates a specific example of coded data obtained in a case where block length of coding is set to 256 bytes. As illustrated in FIG. 5, the transmission apparatus may generate coded data of 256 bytes by adding the redundant code 11 and the delimiter 12 to data 10 for transmission. In addition, the transmission apparatus adds a sequence number to each 256-byte piece of coded data (in FIG. 5, "SN:1" to "SN:8" are added).

Figure 6:
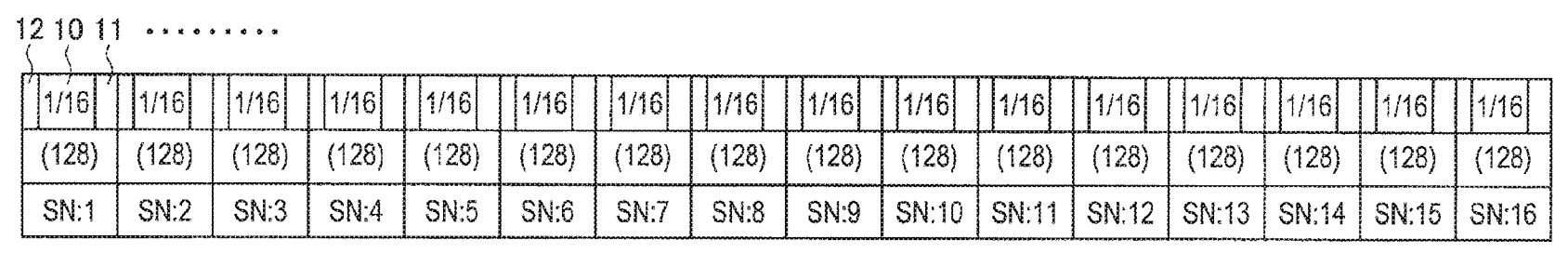

In addition, FIG. 6 illustrates a specific example of coded data obtained in a case where block length of coding is set to 128 bytes. As illustrated in FIG. 6, the transmission apparatus may generate coded data of 128 bytes by adding the redundant code 11 and the delimiter 12 to data 10 for transmission. In addition, the transmission apparatus adds a sequence number to each 128-byte piece of coded data (in FIG. 6, "SN:1" to "SN:16" are added).

It is to be noted that, as described above, the block lengths of coding are not limited to the block lengths illustrated in FIG. 2 to FIG. 6. The block lengths may be changed appropriately.

If the MPDU is longer than data length corresponding to the block length of coding, the transmission apparatus divides the MPDU into pieces each having the data length corresponding to the block length of coding. In one example, as illustrated in FIGS. 7A and 7B, a case where an MPDU has data length of 612 bytes and an RS (255, 239) code, which is a type of Reed-Solomon code, is used as an error correction code is considered.

In this case, as illustrated in FIG. 7A, the transmission apparatus generates data 10 for transmission (referred to as "Data Payload" in FIG. 7A) by dividing the MPDU into pieces each having data length (239 bytes) corresponding to block length of coding, adds a redundant code 11 of 16 bytes and a delimiter 12 of 1 byte to the data for transmission, and generates a 256-byte piece of coded data. Two 239-byte pieces of data for transmission are acquired from the MPDU having data length of 612 bytes.

Next, with regard to residual data of 134 bytes obtained after the two 239-byte pieces of data for transmission are acquired from the MPDU having the data length of 612 bytes, it is possible for the transmission apparatus to generate a piece of data for transmission by adding padding 13 as illustrated in FIG. 7B. More specifically, the transmission apparatus generates a 239-byte piece of data for transmission by adding the padding 13 of 105 bytes to the 134-byte piece of data for transmission. Next, in a similar way, the transmission apparatus generates a 256-byte piece of coded data by adding the redundant code 11 of the 16 bytes and the delimiter 12 of 1 bytes to the generated 239-byte piece of data for transmission. The transmission apparatus generates a physical layer frame by aggregating a plurality of pieces of coded data generated as described above. It is to be noted that the example in which the RS (255, 239) code, which is a type of Reed-Solomon code, is used as the redundant code has been described above. However, it is also possible to use another type of redundant code.

Next, with reference to FIG. 8, a specific example of a case where pieces of coded data are sequentially generated from a plurality of MPDUs is described. The transmission apparatus generates MPDUs by using data for transmission provided by any application, performs the above-described processing on the MPDUs, and generates sequential pieces of coded data. For example, as illustrated in FIG. 8, a case where the transmission apparatus generates an MPDU 1 to an MPDU 4 by using data for transmission provided by any application and performs the above-described processing on the MPDUs is considered.

First, the transmission apparatus divides the MPDU 1 into pieces each having data length corresponding to block length of coding. In the example illustrated in FIG. 8, the MPDU 1 is divided into three pieces of data "SN:1" to "SN:3", and padding 13 is added to the last piece of data "SN:3".

Next, the transmission apparatus divides the MPDU 2. In the example illustrated in FIG. 8, the MPDU 2 is divided into two pieces of data "SN:4" and "SN:5", and padding 13 is added to the last piece of data "SN:5".

In a similar way, the transmission apparatus divides the MPDU 3. In the example illustrated in FIG. 8, the MPDU 3 is divided into three pieces of data "SN:6" to "SN:8". It is to be noted that the MPDU 3 does not include any piece of data that is less than the data length corresponding to the block length of coding. Therefore, padding 13 is not added.

In addition, in a similar way, the transmission apparatus divides the MPDU 4. In the example illustrated in FIG. 8, the MPDU 4 is divided into two pieces of data "SN:9" and "SN:10", and padding 13 is added to the last piece of data "SN:10".

It is to be noted that, it is also possible for the transmission apparatus to perform the processing on the respective MPDUs not sequentially but in parallel.

Next, with reference to FIG. 9, an example of contents of the delimiter is described. As illustrated in FIG. 9, the delimiter includes a "Start Flag", an "End Flag", a "Padding Flag", an "Upload Flag", a "Resend Flag", and a "Discard Flag", and a "Parity Bit" is added thereto. It is to be noted that, as illustrated in FIG. 9, it is possible to add a "Reserved Field" appropriately.

The "Start Flag" is information indicating that the piece of coded data includes data of a beginning portion of the MPDU. For example, in a case where "1" is stored in the "Start Flag", the piece of coded data includes the data of the beginning portion of the MPDU. This makes it possible for the reception apparatus to recognize the data of the beginning portion of the MPDU when forming the MPDU by using a plurality of pieces of coded data.

The "End Flag" is information indicating that the piece of coded data includes data of an end portion of the MPDU. For example, in a case where "1" is stored in the "End Flag", the piece of coded data includes the data of the end portion of the MPDU. This makes it possible for the reception apparatus to recognize the data of the end portion of the MPDU when forming the MPDU by using the plurality of pieces of coded data.

It is to be noted that, in a case where "1" is not stored in neither the "Start Flag" nor the "End Flag", the piece of coded data includes data other than the beginning portion or the end portion of the MPDU (in other words, the piece of coded data includes data of a middle portion of the MPDU).

The "Padding Flag" is information indicating that the piece of coded data includes padding. For example, in a case where "1" is stored in the "Padding Flag", the piece of coded data includes the padding. In a case where the reception apparatus recognizes that the padding is included in the piece of coded data, it is possible for the reception apparatus to remove the padding on the basis of data length information (not illustrated) of the MPDU included in the beginning portion of the MPDU, and extract only an MPDU portion.

The "Upload Flag" is information to be used for instructing to upload the MPDU formed on the basis of the piece of coded data to any application. For example, in a case where a plurality of MPDUs relate to each other, the transmission apparatus stores "1" into the "Upload Flag". This makes it possible to cause the reception apparatus to recognize delimiting positions between the MPDUs related to each other, and it is possible to upload the MPDUs to any applications.

The "Resend Flag" is information indicating that the piece of coded data is retransmitted data. For example, in a case where "1" is stored in the "Resend Flag", the piece of coded data is resend data. This makes it possible for the reception apparatus to recognize that the piece of coded data is resend data when forming the MPDU by using the plurality of pieces of coded data.

The "Discard Flag" is information to be used when the transmission apparatus instructs to discard a piece of data. For example, in a case where retransmission processing has been performed a number of times but the MPDU is not successfully formed, the transmission apparatus stores "1" into the "Discard Flag". This makes it possible to stop the reception apparatus from forming the MPDU and cause the reception apparatus to discard the piece of data. It is to be noted that the situation where the "Discard Flag is used is not limited thereto.

In addition, FIG. 9 illustrates a mere example, and the information stored in the delimiter is not limited thereto. For example, the information stored in the delimiter may be information obtained by adding or omitting a piece of information to/from the information illustrated in FIG. 9.

Next, as described above, the transmission apparatus generates a physical layer frame by aggregating the plurality of pieces of coded data. For example, as illustrated in FIG. 10, the transmission apparatus may generate a physical layer frame by aggregating 8 pieces of coded data (referred to as a "1st Data Block" to a "8th Data Block" in FIG. 10) and adding a physical layer header (referred to as a "Header" in FIG. 10) and a predetermined preamble (referred to as a "Preamble" in FIG. 10) thereto. It is to be noted that the numbers attached to the pieces of coded data in FIG. 10 indicate magnitudes of sequence numbers. More specifically, the "1st Data Block" indicates a piece of coded data with a smallest sequence number in the physical layer frame, and the "8th Data Block" indicates a piece of coded data with a largest sequence number.

Here, the order of the pieces of coded data stored in the physical layer frame is not limited to ascending order of the sequence numbers (the ascending order means that the number increases from the beginning portion of the physical layer frame. Hereinafter, the ascending order may also be referred to as a "forward direction"). For example, as illustrated in FIG. 11, the order of the pieces of coded data may be descending order of sequence numbers (the descending order means that the number decreases from the beginning portion of the physical layer frame. Hereinafter, the descending order may also be referred to as a "reverse direction"). This makes it possible for the transmission apparatus to cause the reception apparatus to easily succeed in the reception processing of the coded data. For example, in a case where a result of the reception processing varies depending on data positions at which pieces of coded data are stored in a physical layer frame, it is possible for the transmission apparatus to change the order of the pieces of coded data in a manner that a piece of the coded data that is desired to succeed in the reception processing is stored at a data position that is an easier place to successfully perform the reception processing. It is to be noted that a case where the order of pieces of coded data is changed is not limited thereto.

In addition, it is also possible for the transmission apparatus to aggregate coded data to be retransmitted (hereinafter, also referred to as "resend data") and coded data to be newly transmitted (hereinafter, also referred to as "new send data") into a single physical layer frame. For example, as illustrated in FIG. 12, the transmission apparatus may aggregate a piece of resend data and seven piece of new send data into a single physical layer frame (it is to be noted that, in FIG. 12, the order of the pieces of coded data is the forward direction). It is to be noted that, FIG. 12 illustrates the example in which the respective pieces of coded data are stored in a manner that the piece of resend data comes first and then the pieces of new send data come next. However, the present invention is not limited thereto. For example, as illustrated in FIG. 13, the respective pieces of coded data may be stored in a manner that the pieces of new send data come first and then the piece of resend data comes next (it is to be noted that, in FIG. 13, the order of the pieces of coded data is the reverse order).

In addition, in a way similar to the pieces of new send data, the number of pieces of resend data stored in the physical layer frame is not specifically limited. For example, as illustrated in FIG. 14, a plurality (four in FIG. 14) of pieces of resend data may be stored in a physical layer frame (it is to be noted that, in FIG. 14, the order of the pieces of coded data is the forward order). In addition, as illustrated in FIG. 15, the respective pieces of coded data may be stored in a physical layer frame in a manner that the pieces of new send data come first and then the pieces of resend data come next (it is to be noted that, in FIG. 15, the order of the pieces of coded data is the reverse order).

In addition, as illustrated in FIG. 16 and FIG. 17, all pieces of coded data aggregated in a physical layer frame may be resend data (the order of the pieces of coded data illustrated in FIG. 16 is the forward direction, and the order of the pieces of coded data illustrated in FIG. 17 is the reverse direction).

In addition, as illustrated in FIG. 18, the transmission apparatus may repeatedly store any of resend data or new send data in a single physical layer. For example, as illustrated in FIG. 18, the transmission apparatus may store two piece of resend data, four piece of new send data, and a repeat of the two piece of resend data in a single physical layer frame (it is to be noted that, in FIG. 18, the order of the pieces of coded data is the forward direction). It is to be noted that, FIG. 18 illustrates the example in which the respective pieces of coded data are stored in a manner that the pieces of resend data comes first, the pieces of new send data come next, and then the repeat comes last. However, the present invention is not limited thereto. For example, as illustrated in FIG. 19, the respective pieces of coded data may be stored in a manner that the repeat comes first, the pieces of new send data come next, and then the pieces of resend data come last (it is to be noted that, in FIG. 19, the order of the pieces of coded data is the reverse order). It is to be noted that the new send data may be repeatedly stored instead of the resend data.

In addition, as illustrated in FIG. 20, it is also possible for the transmission apparatus to store only resend data and a repeat of the resend data in a physical layer frame and store no new send data therein. For example, as illustrated in FIG. 20, the transmission apparatus may store four pieces of resend data and four pieces of repeat data in a single physical layer frame (it is to be noted that, in FIG. 20, the order of the pieces of coded data is the forward direction). It is to be noted that, FIG. 20 illustrates the example in which the respective pieces of coded data are stored in a manner that the resend data comes first and the repeat data comes next. However, the present invention is not limited thereto. As described above, it is possible for the transmission apparatus to make it easier to successfully perform the reception processing of coded data by repeatedly store the coded data in a physical layer frame. More specifically, in a case where reception processing of a certain piece of coded data has failed, such a situation is solved when reception processing of the repeat data succeeds because the piece of coded data is repeatedly stored.

Next, with reference to FIG. 21, an example of contents of the physical layer header is described. The configuration of the physical layer header is similar to the configuration illustrated in FIG. 10, and the physical layer header "Header" includes a "Type" field, an "RX AID" field, a "TX AID" field, a "Block Size" field, a "Block Length" field, a "Count" field, a "1st S/N" field, an "S/N Bitmap" field, an "F/R" field, and a "CRC" field.

The "Type" is information indicating a type of coding or a type of retransmission control of the physical layer frame. For example, as illustrated in FIG. 22, a plurality of patterns such as a "Type1" to a "Type4" may be prepared in advance in accordance with combinations of a type of retransmission control and a type of coding. This makes it possible for the reception apparatus to recognize the type of retransmission control and the type of coding. It is to be noted that information stored in the "Type" field is not limited to the information illustrated in FIG. 22.

The "RX AID" is information to be used for identifying the reception apparatus. More specifically, the "RX AID" field stores an association ID (AID) that makes it possible to uniquely identify the reception apparatus. This makes it possible for the reception apparatus to determine whether or not the physical layer frame is a signal destined for the own reception apparatus.

The "TX AID" is information to be used for identifying the transmission apparatus. More specifically, the "TX AID" field stores an AID that makes it possible to uniquely identify the transmission apparatus. This makes it possible for the reception apparatus to recognize an apparatus that is a transmission source of the physical layer frame, and transmit a response frame to an appropriate destination apparatus.

The "Block Size" is information indicating block length of coding. For example, as illustrated in FIG. 23, the "Block Size" field may store information indicating any of 32 bytes to 2048 bytes. This makes it possible for the reception apparatus to recognize the block length of coding of the physical layer frame. It is to be noted that information stored in the "Block Size" field is not limited to the information illustrated in FIG. 23.

The "Block Length" is information indicating the number of pieces of coded data aggregated in the physical layer frame. For example, as illustrated in FIG. 24, the "Block Length" field may store information indicating that the number of pieces of coded data is 1 to 16. This makes it possible for the reception apparatus to recognize the number of pieces of coded data aggregated in the physical layer frame. It is to be noted that the "Block Length" field may also store information indicating that a received frame is a response frame (the information is referred to as a "Response Frame" in FIG. 24). It is to be noted that information stored in the "Block Length" field is not limited to the information illustrated in FIG. 24.

The "Count" is information indicating the number of pieces of coded data other than repeatedly stored pieces of the coded data among pieces of the coded data stored in the physical layer frame. As illustrated in FIG. 25, the "Count" field may store a value of "1" to "15". For example, the "Count" field stores "6" in a case where the physical layer frame stores 8 pieces of coded data and 2 of the 8 pieces of coded data are the repeatedly stored pieces of coded data. This makes it possible for the reception apparatus to recognize the number of pieces of coded data other than the repeatedly stored pieces of coded data in the physical layer frame. It is to be noted that information stored in the "Count" field is not limited to the information illustrated in FIG. 25.

The "1st S/N" is information indicating the smallest sequence number among the pieces of coded data stored in the physical layer frame.

The "S/N Bitmap" is information indicating sequence numbers of the pieces of coded data stored in a physical layer frame with regard to the physical layer frame other than the response frame. More specifically, the "S/N Bitmap" indicates the sequence numbers of the pieces of coded data stored in the physical layer frame by using relative bit positions based on the value of the "1st S/N". For example, a case where the "1st S/N" field stores "101" and the "S/N Bitmap" field stores "1" at a first, third, fifth, and seventh bit positions from the left like "10101010 00000000" is considered. In this case, the "S/N Bitmap" indicates that the physical layer frame stores pieces of coded data corresponding to sequence numbers "101", "103", "105", and "107".

Alternatively, in the response frame, the "S/N Bitmap" indicates sequence numbers of pieces of coded data that have failed in reception processing (in other words, that have to be retransmitted) and sequence numbers of pieces of coded data that are receivable at a time of next transmission. For example, a case where the "1st S/N" field stores "105" and the "S/N Bitmap" field stores "1" at a first and third to ninth bit positions from the left like "10111111 10000000" is considered with regard to a response frame corresponding to the above-described physical layer frame (in other words, the physical layer frame that stores pieces of coded data corresponding to the sequence numbers "101", "103", "105", and "107"). In this case, the "S/N Bitmap" indicates that the reception processing has failed with regard to pieces of coded data corresponding to the sequence numbers "105" and "107" in the physical layer frame that has been transmitted the last time. In addition, when it is assumed that the pieces of coded data corresponding to "105" and "107" are to be retransmitted, the "S/N Bitmap" indicates that pieces of coded data corresponding to sequence numbers "108" to "113" are receivable at a time of next transmission. It is to be noted that the pieces of coded data that are receivable at the time of next transmission may be decided on the basis of an available space of a reception buffer, processing capacity of the reception apparatus, or the like, for example. However, the present invention is not limited thereto.

The "F/R (Forward/Reverse)" is information indicating the order of pieces of coded data in the physical layer frame. More specifically, as illustrated in FIG. 26, the "F/R" indicates whether the order of the pieces of coded data is the forward direction (referred to as "Forward Seq" in FIG. 26) or the reverse direction (referred to as "Reverse Seq" in FIG. 26). This makes it possible for the reception apparatus to recognize the order of the pieces of coded data included in the physical layer frame. It is to be noted that information stored in the "F/R" field is not limited to the information illustrated in FIG. 26. For example, the "F/R" field may store information indicating whether order of only a portion of the physical layer frame is the forward direction or the reverse direction.

It is to be noted that the above descriptions are mere examples. The contents of the physical layer header are not limited thereto. For example, any piece of information described above may be omitted appropriately.

(2-4 Specific Example of Retransmission Control)

The details of the functions of the wireless LAN system according to the present embodiment have been described above. Next, a specific example of retransmission control in the wireless LAN system is described with reference to FIG. 27 to FIG. 40.

FIG. 27 illustrates a specific example of a physical layer frame that is transmitted for the first time by the transmission apparatus in a series of communication procedures. FIG. 27 illustrates the physical layer frame storing 8 pieces of new send data in the forward direction. In addition, in the physical layer header, the "Block Size" field stores information indicating that block length of coding is 256 bytes, the "Block Length" field stores information indicating that the number of aggregated pieces of coded data is 8, and the "Count" field stores information indicating that the number of pieces of coded data other than repeats is 8. In addition, the "1st S/N" field stores information indicating that the smallest sequence number among the pieces of coded data stored in the physical layer frame is "101", the "S/N Bitmap" field stores information indicating that pieces of coded data with sequence numbers "101" to "108" are stored, and the "F/R" field stores information indicating that the order of the pieces of coded data is the forward direction.

The reception apparatus performs the reception processing including the error detection processing and the error correction processing on the physical layer frame. More specifically, the reception apparatus recognizes the configuration of the physical layer frame on the basis of the information stored in the physical layer header. Next, the reception apparatus detects errors and corrects the errors by extracting redundant information from each piece of the coded data.

As illustrated in FIG. 27, if the reception processing has failed with regard to pieces of coded data corresponding to the sequence numbers "103" and "107" (in FIG. 27, "o" represents a piece of coded data that has succeeded in the reception processing, and "x" represents a piece of coded data that has failed in the reception processing. The same applies to the subsequent drawings), the reception apparatus recognizes the sequence numbers of the pieces of coded data that have failed in the reception processing, on the basis of the "1st S/N" and the "S/N Bitmap".

Next, the reception apparatus transmits, to the transmission apparatus, a response frame that requests retransmission. FIG. 28 illustrates a specific example of the response frame. The "Block Length" field stores information indicating that the physical layer frame is the response frame. In addition, the "1st S/N" field and the "S/N Bitmap" field store information indicating that the sequence numbers of pieces of coded data that have failed in the reception processing (in other words, that have to be retransmitted) are "103" and "107", and sequence numbers of pieces of coded data receivable at a time of next transmission are "109" to "114" if it is assumed that the pieces of coded data corresponding to "103" and "107" are to be retransmitted. It is to be noted that, as described above, the pieces of coded data that are receivable at the time of next transmission may be decided on the basis of an available space of the reception buffer, processing capacity of the reception apparatus, or the like. However, the present invention is not limited thereto.

By receiving the response frame, the transmission apparatus recognizes the sequence numbers of pieces of coded data that have failed in the reception processing (in other words, that have to be retransmitted) and the sequence numbers of pieces of coded data receivable at the time of next transmission. Next, as illustrated in FIG. 29, the transmission apparatus transmits a physical layer frame storing resend data. In the physical layer header, the "1st S/N" field stores information indicating that the smallest sequence number among the pieces of coded data stored in the physical layer frame is "103", and the "S/N Bitmap" field stores information indicating that pieces of coded data with sequence numbers "103", "107", and "109" to "114" are stored.

The reception apparatus performs the reception processing including the error detection processing and the error correction processing on the physical layer frame. For example, as illustrated in FIG. 29, it is assumed that the reception processing has failed with regard to pieces of coded data with sequence numbers "107", "110", and "113".

Next, as illustrated in FIG. 30, the reception apparatus transmits, to the transmission apparatus, a response frame that requests retransmission. In the physical layer header, the "1st S/N" field and the "S/N Bitmap" field store information indicating that the sequence numbers of pieces of coded data that have failed in the reception processing (in other words, that have to be retransmitted) are "107", "110", and "113", and sequence numbers of pieces of coded data receivable at a time of next transmission are "115" and subsequent numbers if it is assumed that the pieces of coded data corresponding to the sequence numbers "107", "110", and "113" are to be retransmitted.

By receiving the response frame, the transmission apparatus recognizes the sequence numbers of pieces of coded data that have failed in the reception processing (in other words, that have to be retransmitted) and the sequence numbers of pieces of coded data receivable at the time of next transmission. Next, as illustrated in FIG. 31, the transmission apparatus transmits a physical layer frame storing resend data. In the physical layer header, the "1st S/N" field stores information indicating that the smallest sequence number among the pieces of coded data stored in the physical layer frame is "107", and the "S/N Bitmap" field stores information indicating that pieces of coded data with sequence numbers "107", "110", "113", and "115" to "119" are stored.

The reception apparatus performs the reception processing including the error detection processing and the error correction processing on the physical layer frame. For example, as illustrated in FIG. 31, it is assumed that the reception processing has failed with regard to pieces of coded data with sequence numbers "110" and "117".

Next, as illustrated in FIG. 32, the reception apparatus transmits, to the transmission apparatus, a response frame that requests retransmission. In the physical layer header, the "1st S/N" field and the "S/N Bitmap" field store information indicating that the sequence numbers of pieces of coded data that have failed in the reception processing (in other words, that have to be retransmitted) are "110" and "117", and sequence numbers of pieces of coded data receivable at a time of next transmission are "120" and subsequent numbers if it is assumed that the pieces of coded data corresponding to the sequence numbers "110" and "117" are to be retransmitted.

Here, for example, it is assumed that the communication of the response frame has failed. In this case, it is impossible for the transmission apparatus to determine whether or not the physical layer frame transmitted the last time has been successfully received. Therefore, as illustrated in FIG. 33, it is possible to retransmit the same physical layer frame as the physical layer frame transmitted the last time. In addition, at this time, to achieve successful communication with higher probability, it is possible for the transmission apparatus to change the order of the pieces of coded data into the reverse direction that is an opposite direction to the direction of the last transmission. In the physical layer header, the "F/R" field stores information indicating that the order of the pieces of coded data is the reverse direction. It is to be noted that details of the control performed in a case where the communication of the response frame has failed are not limited thereto.

The reception apparatus performs the reception processing including the error detection processing and the error correction processing on the physical layer frame. For example, as illustrated in FIG. 33, it is assumed that the reception processing has failed with regard to a piece of coded data with the sequence number "110".

Next, as illustrated in FIG. 34, the reception apparatus transmits, to the transmission apparatus, a response frame that requests retransmission. In the physical layer header, the "1st S/N" field and the "S/N Bitmap" field store information indicating that the sequence number of piece of coded data that has failed in the reception processing (in other words, that has to be retransmitted) is "110", and sequence numbers of pieces of coded data receivable at a time of next transmission are "120" to "124" if it is assumed that the piece of coded data corresponding to the sequence number "110" is to be retransmitted. In other words, the information indicates that the number of pieces of coded data receivable for the reception apparatus is reduced from 8 to 6 for some reason (for example, due to an available space of the reception buffer, processing capacity of the reception apparatus, or the like).

By receiving the response frame, the transmission apparatus recognizes the sequence number of the piece of coded data that has failed in the reception processing (in other words, that has to be retransmitted) and the sequence numbers of pieces of coded data receivable at the time of next transmission. Next, as illustrated in FIG. 35, the transmission apparatus transmits a physical layer frame storing resend data. In the physical layer header, the "1st S/N" field stores information indicating that the smallest sequence number among the pieces of coded data stored in the physical layer frame is "110", and the "S/N Bitmap" field stores information indicating that pieces of coded data with sequence numbers "110" and "120" to "124" are stored. In addition, the "Count" field stores information indicating that the number of pieces of coded data other than repeatedly stored pieces of the coded data is 6.

The reception apparatus performs the reception processing including the error detection processing and the error correction processing on the physical layer frame. For example, as illustrated in FIG. 35, it is assumed that both the resend data and the repeatedly stored resend data have failed in the reception processing with regard to the piece of coded data with the sequence number "110". Alternatively, with regard to a piece of coded data with the sequence number "120", it is assumed that reception processing of new send data has failed, but reception processing of repeatedly stored new send data has succeeded.

Next, as illustrated in FIG. 36, the reception apparatus transmits, to the transmission apparatus, a response frame that requests retransmission. In the physical layer header, the "1st S/N" field and the "S/N Bitmap" field stores information indicating that the sequence number of the piece of coded data that has failed in the reception processing (in other words, that has to be retransmitted) is "110", and sequence numbers of pieces of coded data receivable at a time of next transmission are "125" and subsequent numbers if it is assumed that the piece of coded data corresponding to the sequence number "110" is to be retransmitted.

By receiving the response frame, the transmission apparatus recognizes the sequence number of the piece of coded data that has failed in the reception processing (in other words, that has to be retransmitted) and the sequence numbers of the pieces of coded data receivable at the time of next transmission. In addition, the transmission apparatus recognizes that the reception processing of the piece of coded data corresponding to the sequence number "110" has failed a number of times. Therefore, the transmission apparatus, for example, gives up transmitting the piece of coded data corresponding to the sequence number "110", and transmits a physical layer frame storing pieces of new send data and a repeat of the new send data as illustrated in FIG. 37. In the physical layer header, the "1st S/N" field stores information indicating that the smallest sequence number among the pieces of coded data stored in the physical layer frame is "125", and the "S/N Bitmap" field stores information indicating that pieces of coded data with sequence numbers "125" to "128" are stored. In addition, the "Count" field stores information indicating that the number of pieces of coded data other than repeatedly stored pieces of the coded data is 4.

The reception apparatus performs the reception processing including the error detection processing and the error correction processing on the physical layer frame. For example, as illustrated in FIG. 37, it is assumed that both new send data and repeatedly stored new send data have failed in the reception processing with regard to the piece of coded data with the sequence number "127".

Next, as illustrated in FIG. 38, the reception apparatus transmits, to the transmission apparatus, a response frame that requests retransmission. In the physical layer header, the "1st S/N" field and the "S/N Bitmap" field store information indicating that the sequence number of the piece of coded data that has failed in the reception processing (in other words, that has to be retransmitted) is "127", and sequence numbers of pieces of coded data receivable at a time of next transmission are "129" to "136" if it is assumed that the piece of coded data corresponding to the sequence number "127" is to be retransmitted.

By receiving the response frame, the transmission apparatus recognizes the sequence number of the piece of coded data that has failed in the reception processing (in other words, that has to be retransmitted) and the sequence numbers of the pieces of coded data that are receivable at the time of next transmission. Here, the transmission apparatus ends transmission of new send data in a case where there is no data for transmission. For example, the transmission apparatus transmits a physical layer frame that stores only resend data and a repeat of the resend data but does not store any new send data as illustrated in FIG. 39. In the physical layer header, the "1st S/N" field and the "S/N Bitmap" field store information indicating that only the piece of coded data with the sequence number "127" is stored. In addition, the "Block Length" field stores information indicating that the number of pieces of coded data stored in the physical layer frame is 2, and the "Count" field stores information indicating that the number of pieces of coded data other than repeatedly stored pieces of the coded data is 1.

The reception apparatus performs the reception processing including the error detection processing and the error correction processing on the physical layer frame. As illustrated in FIG. 39, it is assumed that the reception processing of the resend data has failed, but the reception processing of the repeat of the resend data has succeeded.

Last of all, the reception apparatus transmits, to the transmission apparatus, a response frame as illustrated in FIG. 40. In the physical layer header, the "1st S/N" field and the "S/N Bitmap" field store information indicating that there is no piece of coded data that has failed in the reception processing (in other words, that has to be retransmitted), and the series of communication procedures has finished (in other words, there is no piece of coded data receivable at a time of next transmission).

It is to be noted that FIG. 27 to FIG. 40 illustrates a mere example. It is possible to appropriately change the details of the retransmission control performed in the wireless LAN system.

(2-5 Functional Elements of Apparatuses)

The specific example of retransmission control performed in the wireless LAN system has been described above. Next, with reference to FIG. 41, functional elements of the AP 200 and the STA 100 are described.

It is to be noted that, as described above, the STA 100 and the AP 200 may include the same functional elements. Therefore, the functional elements of the STA 100 are mainly described below, and functional elements specific to the AP 200 are described as special notes.

As illustrated in FIG. 41, the STA 100 includes a wireless communication section 110, a wireless interface 120, a controller 130, a wired interface 140, an input section 150, and an output section 160.

(Wireless Communication Section 110)

The wireless communication section 110 is a functional element that performs overall processing related to wireless communication. As illustrated in FIG. 41, the wireless communication section 110 includes an antenna controller 111, a reception processor 112, an MPDU processor 113, a reception buffer 114, a transmission processor 115, an MPDU processor 116, and a transmission buffer 117.

(Antenna Controller 111)

The antenna controller 111 is a functional element that transmits/receives radio signals by controlling at least one antenna. For example, by controlling the antenna, the antenna controller 111 functions as a receiver that receives radio signals transmitted from another communication apparatus, and provides the reception processor 112 with signals subjected to conversion processing to a reception level at which it is possible to extract a base band signal in a subsequent stage. In addition, the antenna controller 111 also functions as a transmitter that controls transmission power as necessary to cause a transmission signal to more surely arrive at a destination apparatus, and transmits the transmission signal generated by the transmission processor 115.

(Reception Processor 112)

The reception processor 112 performs reception processing on a reception signal provided by the antenna controller 111. For example, the reception processor 112 performs analog processing and down-conversion on the reception signal obtained from the antenna and outputs a base band signal. Next, the reception processor 112 detects a predetermined preamble by calculating a correlation between a predetermined signal pattern and the base band signal. This makes it possible for the reception processor 112 to detect a physical layer frame. Next, the reception processor 112 extracts coded data stored in the physical layer frame on the basis of various kinds of information stored in the physical layer header of the physical layer frame. Next, the reception processor 112 performs decoding processing on the coded data, and performs the error detection processing and the error correction processing. The reception processor 112 provides the MPDU processor 113 with data obtained after the reception processing.

In addition, in a way similar to the above, it is possible for the reception processor 112 to detect a response frame. Next, on the basis of various kinds of information stored in a physical layer header of the response frame, the reception processor 112 recognizes the sequence numbers of pieces of the coded data that have failed in the reception processing (in other words, that have to be retransmitted) and the sequence numbers of pieces of coded data receivable at a time of next transmission. The reception processor 112 also functions as a controller that controls retransmission processing in units of pieces of coded data by using such information.

(MPDU Processor 113)

The MPDU processor 113 performs processing related to MPDUs at a time of reception. For example, the MPDU processor 113 recognizes sequence numbers of pieces of the coded data stored in the physical layer frame on the basis of various kinds of information stored in the physical layer header of the physical layer frame. Next, the MPDU processor 113 collects pieces of data in the sequence number order after the reception processing, and recognizes delimiting positions in units of MPDUs on the basis of the "Start Flag" and the "End Flag" stored in a delimiter. Next, the MPDU processor 113 appropriately removes padding, performs combining processing, and forms the original MPDU. The MPDU processor 113 temporarily stores the MPDU in the reception buffer 114. It is to be noted that the MPDU processor 113 may provide the MPDU to any application via the wireless interface 120 or the like.

(Reception Buffer 114)

The reception buffer 114 is a functional element that temporarily stores the formed MPDU. In addition, it is also possible for the reception buffer 114 to temporarily store data that has succeeded in the reception processing but that has not been subjected to the combining processing yet. The reception buffer 114 includes memory that stores such data.

(Transmission Processor 115)

The transmission processor 115 performs transmission processing of the physical layer frame, and also functions as a controller that controls retransmission processing in units of pieces of coded data. More specifically, the transmission processor 115 set a sequence number for each piece of data after the MPDU is divided by the MPDU processor 116, and manages each piece of the data on the basis of the sequence numbers. Next, the transmission processor 115 adds a delimiter storing a "Start Flag", an "End Flag", a "Padding Flag", or the like to each piece of data. In addition, after the padding is added to the data as necessary, the transmission processor 115 performs predetermined coding processing. Next, the transmission processor 115 aggregates pieces of the coded data in various kinds of formats described with reference to FIG. 10 to FIG. 20, adds a physical layer header or the like thereto, and generates a physical layer frame.

The transmission processor 115 generates a base band signal by performing modulation processing on the physical layer frame, and generates a transmission signal by performing up-conversion on the base band signal. The transmission processor 115 provides the transmission signal to the antenna controller 111.

It is to be noted that the transmission processor 115 also performs transmission processing of a response frame. More specifically, the transmission processor 115 generates the response frame by storing various kinds of information in the physical layer header on the basis of whether or not the reception processing including the error correction has succeeded. Next, the transmission processor 115 generates a transmission signal in a way similar to the above, and provides the transmission signal to the antenna controller 111.

(MPDU Processor 116)

The MPDU processor 116 performs processing related to MPDUs at a time of transmission. For example, the MPDU processor 116 forms an MPDU provided with a MAC header including destination information or the like by using information stored in the transmission buffer 117. Next, the MPDU processor 116 divides the MPDU into pieces each having data length corresponding to block length of coding. The MPDU processor 116 provides the divided data to the above-described transmission processor 115.

(Transmission Buffer 117)

The transmission buffer 117 is a functional element that temporarily stores data for transmission that has been provided by any application via the wireless interface 120. In addition, the transmission buffer 117 may store coded data subjected to the coding processing or the like performed by the transmission processor 115. The transmission buffer 117 includes memory that stores such data.

(Wireless Interface 120)

The wireless interface 120 is an interface with the wireless communication section 110, and the wireless interface 120 is a functional element that exchanges information between the wireless communication section 110 and any application.

(Controller 130)

The controller 130 is a functional element that integrally manages overall processing performed by the STA 100. The controller 130 may be implemented by various kinds of IC chips or the like including a central processing unit (CPU), read only memory (ROM), random access memory (RAM), or the like, for example.

(Wired Interface 140)

The wired interface 140 is an interface with, for example, any external apparatus, and the wired interface 140 is a functional element that exchanges information between the STA 100 and the external apparatus. It is to be noted that, the wired interface 240 is necessary for the AP 200 because the wired interface 240 functions as an adapter for coupling to the Internet.

(Input Section 150)

The input section 150 is a functional element that receives input of various kinds of information. For example, the input section 150 includes an input means such as a touchscreen, a button, a keyboard, or a microphone. It is possible for a user to use such an input means and input various kinds of information. It is to be noted that the AP 200 does not have to include the input section 150. Alternatively, the input section 150 included in the AP 200 may have a simplified configuration.

(Output Section 160)

The output section 160 is a functional element that outputs various kinds of information. For example, the output section 160 includes a display means such as a display or a sound output means such as a speaker. The output section 160 may display desired information on the display or the like on the basis of a control signal from the controller 130, or may generate desired sound information through the speaker or the like. It is to be noted that the AP 200 does not have to include the output section 160. Alternatively, the output section 160 included in the AP 200 may have a simplified configuration.

The functional element examples of the AP 200 and the STA 100 have been described above. Note that, the functional elements described with reference to FIG. 41 are a mere example, and the functional elements of the AP 200 or the STA 100 are not limited thereto. For example, the AP 200 or the STA 100 does not have to include the entire functional elements illustrated in FIG. 41. In addition, the functional elements of the AP 200 or the STA 100 may be flexibly changed in accordance with its specification and operation.

(2-6 Operation of Apparatuses)

The functional elements of the AP 200 and the STA 100 have been described above. Next, operation of the AP 200 and the STA 100 is described. It is to be noted that, as described above, the functions according to the present disclosure may be achieved by any of the STA 100 and the AP 200. Hereinafter, for example, operation of the STA 100 that functions as the transmission apparatus and the reception apparatus is described.

(Transmission Operation)

First, with reference to FIG. 42 and FIG. 43, transmission operation of a physical layer frame is described.

In Step S1000, the transmission processor 115 acquires data for transmission that has been provided by any application via the wireless interface 120, and also acquires data length of the data. In Step S1004, the transmission processor 115 acquires destination information. In Step S1008, the transmission processor 115 determines whether or not a reception apparatus that serves as a destination supports the technique according to the present disclosure on the basis of the destination information. In a case where it is determined that the reception apparatus serving as the destination supports the technique according to the present disclosure (YES in Step S1008), the transmission processor 115 sets block length of coding in Step S1012.

In Step S1016, the MPDU processor 116 forms an MPDU by using the data for transmission and divides the MPDU into pieces each having data length corresponding to the block length of coding, and the transmission processor 115 sets a sequence number for each piece of divided data. In Step S1020, the transmission processor 115 determines whether or not padding is necessary. In a case where it is determined that the padding is necessary (in other words, in a case where the data length of the piece of the divided data is less than the data length corresponding to the block length of coding) (YES in Step S1020), the transmission processor 115 adds the padding in Step S1024. It is to be noted that, in a case where it is determined that the padding is not necessary (in other words, in a case where data length of the piece of the divided data is equal to the data length corresponding to the block length of coding) (NO in Step S1020), the padding is not added.

In Step S1028, the transmission processor 115 sets a delimiter. For example, the transmission processor 115 sets the "Start Flag", the "End Flag", the "Padding Flag", or the like for the delimiter as necessary. In Step S1032, the transmission processor 115 adds a redundant code by performing predetermined coding processing. Next, the transmission apparatus repeats the processing described in Step S1016 to Step S1032 up to the last piece of the data for transmission stored in the transmission buffer 117.

In a case where the coding processing or the like has performed up to the last piece of data for transmission stored in the transmission buffer 117 (YES in Step S1036), the transmission processor 115 sets return of a response frame in Step S1040, and adds a physical layer header on the basis of this setting or the like in Step S1044. In Step S1048, the transmission processor 115 generates a physical layer frame by adding a predetermined preamble. In Step S1052, the antenna controller 111 transmits the physical layer frame, and the series of transmission processing ends.

In a case where it is determined that the reception apparatus serving as the destination does not support the technique according to the present disclosure (NO in Step S1008) in Step S1008 and it is possible for the transmission apparatus to generate a predetermined A-MPDU (YES in Step S1056), the transmission processor 115 sets a delimiter for each MPDU in the A-MPDU in Step S1060. In addition, the transmission processor 115 determines whether or not padding is necessary in Step S1064. In a case where it is determined that the padding is necessary (YES in Step S1064), the transmission processor 115 adds the padding in Step S1068. In Step S1072, the transmission processor 115 configures various kinds of settings with regard to a currently available response frame in a MAC layer, and then processing described in Step S1044 and subsequent steps is performed.

(Reception Operation)

Next, with reference to FIG. 44 and FIG. 45, reception operation of the physical layer frame is described.

In Step S1100, the reception processor 112 detects the physical layer frame by detecting the predetermined preamble. In Step S1104, the reception processor 112 determines whether or not the detected physical layer frame supports the present disclosure on the basis of the way of arrangement of the physical header or all or a portion of information included in the physical layer header. In a case where it is determined that the detected physical layer frame supports the present disclosure (YES in Step S1104), the reception processor 112 acquires the physical layer header in Step S1108.

In Step S1112, the reception processor 112 determines whether or not the physical layer frame is destined for the own apparatus on the basis of the "RX AID" included in the acquired physical layer header. In a case where it is determined that the physical layer frame is destined for the own apparatus (YES in Step S1112), the reception processor 112 divides the portion following the physical layer header of the physical layer frame into pieces each having block length of coding, and performs the reception processing on coded data in Step S1116. The reception processing includes the error detection processing and the error correction processing. In a case where it is determined that the physical layer frame is not destined for the own apparatus (NO in Step S1112), the processing returns to Step S1100, and then the detection processing of the predetermined preamble is subsequently performed.

In a case where the reception processing including the error detection processing and the like has succeeded (YES in Step S1120), the MPDU processor 113 collects pieces of data subjected to the reception processing in order of sequence numbers in Step S1124. In Step S1128, the MPDU processor 113 searches for the last piece of data in the MPDU on the basis of a value of the "End Flag" included in the delimiter. More specifically, the MPDU processor 113 searches for a piece of data with the "End Flag" of "1". In a case where the MPDU processor 113 has found the last piece of data of the MPDU (YES in Step S1128), the MPDU processor 113 removes padding from the piece of data subjected to the reception processing in Step S1132.

In Step S1136, the MPDU processor 113 checks whether or not there is the whole payload of a certain MPDU. In a case where there is the whole payload of the certain MPDU (YES in Step S1136), the MPDU processor 113 forms the MPDU by combining the pieces of data subjected to the reception processing in Step S1140.

In a case where the reception processing including the error detection processing and the like has failed (NO in Step S1120) in Step S1120, the reception processor 112 recognizes and stores sequence numbers of pieces of coded data that have failed in the reception processing in Step S1144. Next, the transmission apparatus repeats the processing described in Step S1116 to Step S1144 up to the last piece of the data in the received physical layer frame.

In a case where the processing described in Step S1116 to Step S1144 has been repeated up to the last piece of the data in the received physical layer frame (YES in Step S1148), the transmission processor 115 acquires information related to a response frame in Step S1152. For example, the transmission processor 115 acquires various kinds of information to be stored in the physical layer header of the response frame. In Step S1156, the transmission processor 115 generates the response frame by generating a physical layer header and adding a predetermined preamble. Next, in a case where a predetermined response timing (for example, a timing at which a predetermined period of time has elapsed since the communication of the physical layer frame) has come (YES in Step S1160), the antenna controller 111 transmits the generated response frame in Step S1164, and the series of reception processing ends.

In a case where it is determined that the detected physical layer frame does not support the present disclosure (NO in Step S1104) in Step S1104, the reception processor 112 performs currently-available MPDU reception processing in Step S1168. In a case where the reception processing including the error detection processing and the like has succeeded (YES in Step S1172), the MPDU processor 113 acquires the MPDU subjected to the reception processing in Step S1176. In Step S1180, the reception processor 112 stores information indicating that the reception processing of the MPDU has succeeded, as information related to the response frame.

If the received physical layer frame has an A-MPDU configuration, the reception apparatus repeats the processing described in Step S1168 to Step S1180 up to the last MPDU in the A-MPDU. In a case where the processing described in Step S1168 to Step S1180 has been repeated up to the last MPDU (YES in Step S1184), the transmission processor 115 acquires information related to a response frame in Step S1188. In Step S1192, the transmission processor 115 generates the response frame by generating the physical layer header and adding a predetermined preamble. Next, the processing in Step S1160 and subsequent steps is performed.

(Retransmission Operation)

Next, with reference to FIG. 46 and FIG. 47, retransmission operation of the physical layer frame is described. FIG. 46 and FIG. 47 illustrates processing after the transmission apparatus transmits a physical layer frame and receives a response frame from a destination apparatus.

In Step S1200, the reception processor 112 detects the response frame by detecting a predetermined preamble. In Step S1204, the reception processor 112 determines whether or not the detected response frame supports the present disclosure on the basis of the way of arrangement of the physical header or all or a portion of information included in the physical layer header. In a case where it is determined that the detected response frame supports the present disclosure (YES in Step S1204), the reception processor 112 acquires the physical layer header in Step S1208.

In Step S1212, the reception processor 112 determines whether or not the response frame is destined for the own apparatus on the basis of the "RX AID" included in the acquired physical layer header. In a case where it is determined that the response frame is destined for the own apparatus (YES in Step S1212), the reception processor 112 acquires the "1st S/N" and the "S/N Bitmap" included in the physical layer header in Step S1216. In a case where it is determined that the response frame is not destined for the own apparatus (NO in Step S1212), the processing returns to Step S1200, and then detection processing of a predetermined preamble is performed.

In Step S1220, by checking the "1st S/N" and the "S/N Bitmap" against the sequence numbers of the pieces of coded data transmitted the last time, the reception processor 112 recognizes the sequence numbers of pieces of the coded data that have failed in the reception processing performed by the reception apparatus (in other words, that have to be retransmitted) and the sequence numbers of pieces of coded data receivable at a time of next transmission. In a case where there is a piece of the coded data that has to be retransmitted (YES in Step S1224), the transmission processor 115 acquires the first transmission time (time at which the first physical layer frame has been transmitted in the series of transmission processing) in Step S1228. In a case where a processing timing is within a retransmittable time period on the basis of the first transmission time (YES in Step S1232), the transmission processor 115 acquires the piece of coded data that has to be transmitted and stores the piece of coded data as resend data in a physical layer frame in Step S1236.

In Step S1240, the transmission processor 115 acquires the "Count" in the physical layer header and checks the number of pieces of coded data storable in a physical layer frame. In a case where the number of pieces of coded data stored in the physical layer frame (in other words, the number of pieces of resend data stored in the physical layer frame) reaches the value of the "Count" (YES in Step S1244), the transmission processor 115 generates the physical layer frame by adding a physical layer header in Step S1248 and adding a predetermined preamble in Step S1252. In Step S1256, the antenna controller 111 transmits the physical layer frame, and the series of transmission processing ends.

In a case where the number of pieces of coded data stored in the physical layer frame does not reach the value of the "Count" (NO in Step S1244) in Step S1244, the transmission processor 115 checks a usage situation of the transmission buffer 117 in Step S1260, and checks whether or not there is a piece of coded data that has not yet been transmitted. In a case where there is a piece of coded data that has not yet been transmitted (YES in Step S1264), the transmission processor 115 acquires the "1st S/N" and the "S/N Bitmap" included in the physical layer header of the response frame in Step S1268. In Step S1272, the transmission processor 115 checks whether or not the piece of coded data that has not yet been transmitted includes a piece of coded data receivable for the reception apparatus, on the basis of the acquired "1st S/N" and "S/N Bitmap". In a case where the piece of coded data that has not yet been transmitted includes a piece of coded data receivable for the reception apparatus (YES in Step S1272), the transmission processor 115 acquires the piece of coded data as a piece of new send data, and stores the piece of new send data in a physical layer frame in Step S1276.

In a case where the number of pieces of coded data stored in the physical layer frame (in other words, the number of pieces of resend data and new send data stored in the physical layer frame) reaches the value of the "Count" (YES in Step S1280), the processing described in Step S1248 to Step S1256 is performed, and this makes it possible to transmit the physical layer frame. In a case where the number of pieces of coded data stored in the physical layer frame does not reach the value of the "Count" (NO in Step S1280), the transmission processor 115 acquires any of the pieces of resend data or new send data stored in the physical layer frame again, and repeatedly stores the acquired piece of data in a physical layer frame in Step S1284. Next, the processing described in Step S1248 to Step S1256 is performed, and this makes it possible to transmit the physical layer frame.

In a case where it is determined that the detected response frame does not support the present disclosure in Step S1204 (NO in Step S1204), currently-available retransmission control is performed. More specifically, in Step S1288, the reception processor 112 acquires various kinds of information stored in the response frame. In a case where a processing timing is within a retransmittable time period (YES in Step S1292), the transmission processor 115 acquires resend data and stores the resend data in the physical layer frame in Step S1296. Next, the processing in Step S1248 and subsequent steps is performed.

It is to be noted that, it may not be necessary to chronologically execute respective steps illustrated in the above-described flowcharts in FIG. 42 to FIG. 47, in the order described in the flowcharts. In other words, the respective steps in the flowcharts may be performed in order different from the orders described in the flow charts, and may also be performed in parallel.

3. APPLICATION EXAMPLE

The technique according to the present disclosure may be applied to various products. For example, the STAs 100 may be realized as mobile terminals such as smartphones, tablet PCs (personal computers), laptop PCs, portable game terminals, or digital cameras, fixed-type terminals such as television receivers, printers, digital scanners, or network storages, or vehicle-mounted terminals such as car navigation apparatuses. In addition, the STAs 100 may be realized as terminals that perform M2M (machine to machine) communication (also referred to as MTC (machine-type communication) terminals) such as smart meters, vending machines, remotely controlled surveillance apparatuses, or POS (point of sale) terminals. Furthermore, the STAs 100 may be wireless communication modules mounted in such terminals (for example, an integrated circuit module including one die).

Alternatively, for example, the APs 200 may be realized as wireless LAN access points (also referred to as wireless base stations), each of which has a router function or does not have a router function. Alternatively, the APs 200 may be realized as mobile wireless LAN routers. The APs 200 may also be wireless communication modules (for example, an integrated circuit module including one die) mounted on such apparatuses.

4-1. First Application Example

FIG. 48 is a block diagram illustrating an example of a schematic configuration of a smartphone 900 to which the technique according to the present disclosure may be applied. The smartphone 900 includes a processor 901, memory 902, a storage 903, an externally coupled interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a CPU (central processing unit) or an SoC (system on chip), and controls functions of an application layer and other layers of the smartphone 900. The memory 902 includes RAM (random access memory) and ROM (read only memory), and stores programs executed by the processor 901 and data. The storage 903 may include a storage medium such as semiconductor memory or a hard disk. The externally coupled interface 904 is an interface for coupling an externally attached device such as a memory card or a USB (Universal Serial Bus) device to the smartphone 900.

The camera 906 includes an image sensor, for example, a CCD (charge-coupled device) or a CMOS (complementary metal-oxide-semiconductor), to generate captured images. The sensor 907 may include a sensor group including, for example, a positioning sensor, a gyro sensor, a geomagnetic sensor, an acceleration sensor, and the like. The microphone 908 converts sounds inputted to the smartphone 900 into audio signals. The input device 909 includes, for example, a touch sensor that detects touches on a screen of the display device 910, a keypad, a keyboard, buttons, switches, and the like, to receive operation or information inputted by a user. The display device 910 has a screen such as a liquid crystal display (LCD), or an organic light emitting diode (OLED) display to display output images of the smartphone 900. The speaker 911 converts audio signals outputted from the smartphone 900 into sounds.

The wireless communication interface 913 supports one or more wireless LAN standards such as IEEE 802.11a, 11b, 11g, 11n, 11ac, and 11ad, to establish wireless communication. The wireless communication interface 913 may communicate with another apparatus via a wireless LAN access point in an infrastructure mode. In addition, the wireless communication interface 913 may directly communicate with another apparatus in a direct communication mode such as an ad hoc mode or Wi-Fi Direct (registered trademark). It is to be noted that Wi-Fi Direct is different from the ad hoc mode, and thus one of two terminals operates as an access point. However, communication is performed directly between the terminals. The wireless communication interface 913 may typically include a baseband processor, an RF (radio frequency) circuit, a power amplifier, and the like. The wireless communication interface 913 may be a single chip module on which memory that stores a communication control program, a processor that executes the program, and a relevant circuit are integrated. The wireless communication interface 913 may support another kind of wireless communication scheme such as a cellular communication scheme, a short-range wireless communication scheme, or a proximity wireless communication scheme in addition to the wireless LAN scheme. The antenna switch 914 switches a coupling destination of the antenna 915 between a plurality of circuits (for example, circuits for different wireless communication schemes) included in the wireless communication interface 913. The antenna 915 includes a single or a plurality of antenna elements (for example, a plurality of antenna elements constituting a MIMO antenna), and is used for transmission and reception of radio signals through the wireless communication interface 913.

It is to be noted that the smartphone 900 may include a plurality of antennas (for example, an antenna for the wireless LAN and an antenna for the proximity wireless communication scheme, or the like), without being limited to the example illustrated in FIG. 48. In this case, the antenna switch 914 may be omitted from the configuration of the smartphone 900.

The bus 917 couples the processor 901, the memory 902, the storage 903, the externally coupled interface 904, the camera 906, the sensor 907, the microphone 908, the input device 909, the display device 910, the speaker 911, the wireless communication interface 913, and the auxiliary controller 919 to one another. The battery 918 supplies electric power to each of the blocks of the smartphone 900 illustrated in FIG. 48 via power supply lines partially indicated by dashed lines in FIG. 48. The auxiliary controller 919 causes, for example, necessary minimum functions of the smartphone 900 to be operated in a sleep mode.

It is to be noted that the smartphone 900 may operate as a wireless access point (software AP) as the processor 901 executes the function of an access point at an application level. In addition, the wireless communication interface 913 may have the function of a wireless access point.

4-2. Second Application Example

FIG. 49 is a block diagram illustrating an example of a schematic configuration of a car navigation apparatus 920 to which the technique according to the present disclosure may be applied. The car navigation apparatus 920 includes a processor 921, memory 922, a GPS (Global Positioning System) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC, and controls a navigation function and other functions of the car navigation apparatus 920. The memory 922 includes RAM and ROM, and stores programs executed by the processor 921 and data.

The GPS module 924 measures a position of the car navigation apparatus 920 (for example, latitude, longitude, and altitude) using GPS signals received from a GPS satellite. The sensor 925 may include a sensor group including, for example, a gyro sensor, a geomagnetic sensor, an atmospheric pressure sensor, and the like. The data interface 926 is coupled to an in-vehicle network 941 via, for example, a terminal (not illustrated) to acquire data generated on the vehicle side such as vehicle speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive operation or information inputted by a user. The display device 930 includes a screen such as an LCD or an OLED display to display images of the navigation function or reproduced content. The speaker 931 outputs sounds of the navigation function or reproduced content.

The wireless communication interface 933 supports one or more wireless LAN standards such as IEEE 802.11a, 11b, 11g, 11n, 11ac, and 11ad, to establish the wireless communication. The wireless communication interface 933 may communicate with another apparatus via a wireless LAN access point in an infrastructure mode. In addition, the wireless communication interface 933 may directly communicate with another apparatus in a direct communication mode such as an ad hoc mode or Wi-Fi Direct. The wireless communication interface 933 may typically include a baseband processor, an RF circuit, a power amplifier, and the like. The wireless communication interface 933 may be a single-chip module on which memory that stores a communication control program, a processor that executes the program, and a relevant circuit are integrated. The wireless communication interface 933 may support another kind of wireless communication scheme such as the cellular communication scheme, the short-range wireless communication scheme, or the proximity wireless communication scheme in addition to the wireless LAN scheme. The antenna switch 934 switches a coupling destination of the antenna 935 between a plurality of circuits included in the wireless communication interface 933. The antenna 935 includes a single or a plurality of antenna elements and is used for transmission and reception of radio signals through the wireless communication interface 933.

It is to be noted that the car navigation apparatus 920 may include a plurality of antennas, without being limited to the example illustrated in FIG. 49. In this case, the antenna switch 934 may be omitted from the configuration of the car navigation apparatus 920.

The battery 938 supplies electric power to each of the blocks of the car navigation apparatus 920 illustrated in FIG. 49 via power supply lines partially indicated by dashed lines in the FIG. 49. In addition, the battery 938 accumulates electric power supplied from the vehicle side.

Further, the technique according to the present disclosure may be realized as an in-vehicle system (or a vehicle) 940 including one or more blocks of the above-described car navigation apparatus 920, the in-vehicle network 941, and a vehicle-side module 942. The vehicle-side module 942 generates vehicle-side data such as a vehicle speed, the number of engine revolutions, or failure information, and outputs the generated data to the in-vehicle network 941.

4-3. Third Application Example

FIG. 50 is a block diagram illustrating an example of a schematic configuration of a wireless access point 950 to which the technique according to the present disclosure may be applied. The wireless access point 950 includes a controller 951, memory 952, an input device 954, a display device 955, a network interface 957, a wireless communication interface 963, an antenna switch 964, and an antenna 965.

The controller 951 may be, for example, a CPU or a digital signal processor (DSP) and operates various functions (for example, access limitation, routing, encryption, fire wall, and log management) of an Internet Protocol (IP) layer and higher layers of the wireless access point 950. The memory 952 includes RAM and ROM and stores programs executed by the controller 951 and various kinds of control data (for example, a terminal list, a routing table, an encryption key, security settings, a log, and the like).

The input device 954 includes, for example, a button or a switch, and receives operation performed by a user. The display device 955 includes an LED lamp or the like and displays an operation status of the wireless access point 950.

The network interface 957 is a wired communication interface that couples the wireless access point 950 to a wired communication network 958. The network interface 957 may include a plurality of coupling terminals. The wired communication network 958 may be a LAN such as Ethernet (registered trademark) or may be a wide area network (WAN).

The wireless communication interface 963 supports one or more wireless LAN standards such as IEEE 802.11a, 11b, 11g, 11n, 11ac, and 11ad, to wirelessly couple to a nearby terminal as an access point. The wireless communication interface 963 may typically include a baseband processor, an RF circuit, a power amplifier, and the like. The wireless communication interface 963 may be a single-chip module on which memory that stores a communication control program, a processor that executes the program, and a relevant circuit are integrated. The antenna switch 964 switches a coupling destination of the antenna 965 between a plurality of circuits included in the wireless communication interface 963. The antenna 965 includes a single or a plurality of antenna elements and is used to transmit and receive radio signals through the wireless communication interface 963.

4. CONCLUSION

As described above, it is possible for the wireless LAN system according to the present embodiment to reduce wasteful retransmission processing and improve use efficiency of communication channels by controlling the retransmission processing not in units of MPDUs but in units but in units of pieces of coded data. In other words, it is not necessary for the wireless LAN system according to the present embodiment to perform retransmission processing in units of MPDUs, which has larger data length than the piece of coded data.

The details of the preferred embodiments of the present disclosure have been described above with reference to the accompanying drawings, whilst the technical scope of the present disclosure is not limited to such examples. It is obvious that a person having ordinary skill in the art of the present disclosure may find various alterations or modifications within the scope of the technical idea described in the claims, and it should be understood that these alterations and modifications naturally come under the technical scope of the present disclosure.

Further, the effects described herein are merely illustrative or exemplary, and are not limitative. That is, the technique according to the present disclosure may achieve, in addition to or in place of the above effects, other effects that are obvious to those skilled in the art from the description of the present specification.

It is to be noted that the present technology may also have the following configurations.

(1)

A wireless LAN communication apparatus including:
a transmitter that transmits a data frame storing a plurality of fixed-length pieces of coded data for which it is possible to determine whether or not decoding is successfully performed; and
a controller that controls retransmission processing in units of the pieces of coded data.

(2)

The wireless LAN communication apparatus according to (1), further including a transmission processor that divides any data in units of the pieces of coded data, aggregates a plurality of pieces of the coded data, and generates the data frame to which a predetermined preamble is added.

(3)

The wireless LAN communication apparatus according to (2), in which the transmission processor stores, in the data frame, coded data to be retransmitted or coded data to be newly transmitted.

(4)

The wireless LAN communication apparatus according to (2) or (3), in which the transmission processor repeatedly stores same coded data in the data frame.

(5)

The wireless LAN communication apparatus according to any one of (2) to (4), in which the transmission processor manages the pieces of coded data by using sequence numbers.

(6)

The wireless LAN communication apparatus according to (5), in which the transmission processor stores the pieces of coded data in the data frame in ascending order or in descending order of the sequence numbers.

(7)

The wireless LAN communication apparatus according to any one of (2) to (6), in which the transmission processor adds, to the data frame, header information that stores a parameter related to the coded data.

(8)

The wireless LAN communication apparatus according to (7), in which the header information includes information related to a block length of coding, information related to a number of the pieces of coded data stored in the data frame, information for identifying the pieces of coded data stored in the data frame, or information related to storing order of the pieces of coded data.

(9)

The wireless LAN communication apparatus according to any one of (2) to (8), in which the transmission processor decides a piece of the coded data to be stored in the data frame, on the basis of information for identifying a receivable piece of the coded data.

(10)

The wireless LAN communication apparatus according to (2) to (9), in which the transmission processor includes, in a piece of the coded data, delimiter information that indicates a data position of a divided portion of the any data.

The wireless LAN communication apparatus according to (2) to (10), in which the any data includes an MPDU, an MSDU, a control frame, a management frame, or an action frame.

(12)

A wireless LAN communication method performed by a computer, the method including:

transmitting a data frame storing a plurality of fixed-length pieces of coded data for which it is possible to determine whether or not decoding is successfully performed; and controlling retransmission processing in units of the pieces of coded data.

(13)

A wireless LAN communication program that causes a computer to:

transmit a data frame storing a plurality of fixed-length pieces of coded data for which it is possible to determine whether or not decoding is successfully performed; and control retransmission processing in units of the pieces of coded data.

(14)

A wireless LAN communication apparatus including:

a receiver that receives a data frame storing a plurality of fixed-length pieces of coded data for which it is possible to determine whether or not decoding is successfully performed; and a controller that controls retransmission processing in units of the pieces of coded data.

(15)

The wireless LAN communication apparatus according to (14), further including a reception processor that identifies aggregated pieces of the coded data on the basis of header information of the data frame following a predetermined preamble, and performs reception processing including decoding of each of the pieces of the coded data.

(16)

The wireless LAN communication apparatus according to (15), in which the coded data includes data obtained by coding a divided portion of any data, and the reception processor forms the any data by combining processing using the plurality of pieces of coded data.

(17)

The wireless LAN communication apparatus according to any one of (14) to (16), further including a transmission processor that generates a response frame including information for identifying a piece of the coded data which has failed in the reception processing and which has to be retransmitted.

(18)

The wireless LAN communication apparatus according to (17), in which the transmission processor includes, in the response frame, information for identifying a piece of the coded data which is receivable at a time of next transmission.

(19)

A wireless LAN communication method performed by a computer, the method including:

receiving a data frame storing a plurality of fixed-length pieces of coded data for which it is possible to determine whether or not decoding is successfully performed; and controlling retransmission processing in units of the pieces of coded data.

(20)

A wireless LAN communication program that causes a computer to:

receive a data frame storing a plurality of fixed-length pieces of coded data for which it is possible to determine whether or not decoding is successfully performed; and control retransmission processing in units of the pieces of coded data.

REFERENCE SIGNS LIST

100: STA
200: AP
110, 210: wireless communication section
111, 211: antenna controller
112, 212: reception processor
113, 213: MPDU processor
114, 214: reception buffer
115, 215: transmission processor
116, 216: MPDU processor
117, 217: transmission buffer
120, 220: wireless interface
130, 230: controller
140, 240: wired interface
150, 250: input section
160, 260: output section

The invention claimed is:

1. A wireless local area network (LAN) communication apparatus, comprising:

a transmission processor configured to:

divide specific data into a plurality of fixed-length pieces of coded data; and generate a data frame based on aggregation of the plurality of fixed-length pieces of the coded data, wherein the data frame includes a specific preamble associated with the plurality of fixed-length pieces of the coded data; and a transmitter configured to transmit the data frame to at least one device, wherein the transmission processor is further configured to control a retransmission process in units of the plurality of fixed-length pieces of the coded data.

2. The wireless LAN communication apparatus according to claim 1, wherein the transmission processor is further configured to store, in the data frame, at least one of the plurality of fixed-length pieces of the coded data associated with the retransmission process.

3. The wireless LAN communication apparatus according to claim 1, wherein the transmission processor is further configured to repeatedly store the plurality of fixed-length pieces of the coded data in the data frame.

4. The wireless LAN communication apparatus according to claim 1, wherein the transmission processor is further configured to control each of the plurality of fixed-length pieces of the coded data based on a respective sequence number of each of the plurality of fixed-length pieces of the coded data.

5. The wireless LAN communication apparatus according to claim 1, wherein the transmission processor is further configured to store the plurality of fixed-length pieces of the coded data in the data frame in an ascending order of sequence numbers or in a descending order of the sequence numbers.

6. The wireless LAN communication apparatus according to claim 1, wherein the transmission processor is further configured to add, to the data frame, header information that stores a indicates one or more parameters associated with the plurality of fixed-length pieces of the coded data.

7. The wireless LAN communication apparatus according to claim 6, wherein the header information includes at least one of information associated with a block length of coding, information associated with a number of the plurality of fixed-length pieces of the coded data in the data frame, identification information of the plurality of fixed-length pieces of the coded data in the data frame, or information associated with an order of the plurality of fixed-length pieces of the coded data in the data frame.

8. The wireless LAN communication apparatus according to claim 1, wherein the transmission processor is further configured to:
   determine a specific piece of the plurality of fixed-length pieces of the coded data based on identification information of the specific piece;
   add the specific piece to the data frame; and
   control the retransmission process based on the specific piece in the data frame.

9. The wireless LAN communication apparatus according to claim 1, wherein
   the transmission processor is further configured to add delimiter information in a specific piece of the coded data in the data frame,
   the specific piece of the coded data in the data frame is different from the plurality of fixed-length pieces of the coded data in the data frame, and
   the delimiter information indicates a data position of the plurality of fixed-length pieces of the coded data in the data frame.

10. The wireless LAN communication apparatus according to claim 1, wherein the specific data comprises one of a Media Access Control (MAC) layer Protocol Data Unit (MPDU), a MAC layer Service Data Unit (MSDU), a control frame, a management frame, or an action frame.

11. A wireless local area network (LAN) communication method, comprising:
   dividing specific data into a plurality of fixed-length pieces of coded data;
   generating a data frame based on aggregation of the plurality of fixed-length pieces of the coded data,
      wherein the data frame includes a specific preamble associated with the plurality of fixed-length pieces of the coded data;
   transmitting the data frame to at least one device; and
   controlling a retransmission process in units of the plurality of fixed-length pieces of the coded data.

12. A non-transitory computer-readable medium having stored thereon computer-executable instructions which, when executed by a computer, cause the computer to execute operations, the operations comprising:
   dividing specific data into a plurality of fixed-length pieces of coded data;
   generating a data frame based on aggregation of the plurality of fixed-length pieces of the coded data, wherein
      the data frame includes a specific preamble associated with the plurality of fixed-length pieces of the coded data;
   controlling transmission of the data frame; and
   controlling a retransmission process in units of the plurality of fixed-length pieces of the coded data.

13. A wireless local area network (LAN) communication apparatus, comprising:
   a receiver configured to receive a data frame that includes a plurality of fixed-length pieces of coded data, wherein
      the plurality of fixed-length pieces of the coded data is generated based on:
         division of specific data into the plurality of fixed-length pieces of the coded data, and
         aggregation of the plurality of fixed-length pieces of the coded data, and
      the data frame includes a specific preamble associated with the plurality of fixed-length pieces of the coded data; and
   a controller configured to control a retransmission process in units of the plurality of fixed-length pieces of the coded data.

14. The wireless LAN communication apparatus according to claim 13, further comprising:
   a reception processor configured to:
      identify the plurality of fixed-length pieces of the coded data in the data frame based on header information of the data frame; and
      execute a reception process of each piece of the plurality of fixed-length pieces of the coded data based on the identification of each piece of the plurality of fixed-length pieces of the coded data.

15. The wireless LAN communication apparatus according to claim 14, wherein the reception processor is further configured to combine the plurality of fixed-length pieces of the coded data to obtain the specific data.

16. The wireless LAN communication apparatus according to claim 13, further comprising:
   a transmission processor configured to generate a response frame, wherein
      the response frame includes identification information of a specific piece of the plurality of fixed-length pieces of the coded data, and
   the controller is further configured to control the retransmission process based on the response frame which.

17. The wireless LAN communication apparatus according to claim 16, wherein the specific piece of the plurality of fixed-length pieces of the coded data corresponds to a piece of the coded data received based on the retransmission process.

18. A wireless local area network (LAN) communication method, the comprising:
   receiving a data frame that includes a plurality of fixed-length pieces of coded data, wherein
      the plurality of fixed-length pieces of the coded data is generated by:
         dividing specific data into the plurality fixed-length pieces of the coded data; and
         aggregating the plurality of fixed-length pieces of the coded data, and
      the data frame includes a specific preamble associated with the plurality of fixed-length pieces of the coded data; and
   controlling a retransmission process in units of the plurality of fixed-length pieces of the coded data.

19. A non-transitory computer-readable medium having stored thereon computer-executable instructions which, when executed by a computer, cause the computer to execute operations, the operations comprising:
   receiving a data frame that includes a plurality of fixed-length pieces of coded data, wherein
      the plurality of fixed-length pieces of the coded data is generated by:
         dividing specific data into the plurality fixed-length pieces of the coded data; and
         aggregating the plurality of fixed-length pieces of the coded data, and the data frame includes a specific preamble associated with the plurality of fixed-length pieces of the coded data; and controlling a retransmission process in units of the fixed-length pieces of the coded data.

* * * * *